(12) United States Patent
Shiomi et al.

(10) Patent No.: US 7,100,467 B2
(45) Date of Patent: *Sep. 5, 2006

(54) SHIFT DEVICE FOR VEHICLE

(75) Inventors: Hiroki Shiomi, Hekinan (JP); Yoji Matsumoto, Okazaki (JP); Akihiro Takezaki, Toyota (JP); Haruo Tuge, Toyota (JP); Akinosuke Shindou, Nagoya (JP); Hideki Miyata, Okazaki (JP); Yasuo Hojo, Nagoya (JP); Hideo Tomomatsu, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 139 days.

This patent is subject to a terminal disclaimer.

(21) Appl. No.: 10/860,040

(22) Filed: Jun. 4, 2004

(65) Prior Publication Data

US 2004/0216547 A1    Nov. 4, 2004

Related U.S. Application Data

(62) Division of application No. 10/085,734, filed on Mar. 1, 2002, now Pat. No. 6,948,582.

(30) Foreign Application Priority Data

Mar. 2, 2001   (JP)   ............................. 2001-059138
Mar. 12, 2001  (JP)   ............................. 2001-068302

(51) Int. Cl.
    *F16H 59/00*   (2006.01)
(52) U.S. Cl. ........................................................ 74/335
(58) Field of Classification Search ................ 180/315, 180/336; 74/335
    See application file for complete search history.

(56) References Cited

U.S. PATENT DOCUMENTS

| 3,937,105 | A | 2/1976 | Arai et al. |
| 4,558,612 | A | 12/1985 | Shimizu et al. |
| 4,709,793 | A | 12/1987 | Sakakibara et al. |
| 4,892,014 | A | 1/1990 | Morell et al. |
| 4,939,502 | A | 7/1990 | Ito et al. |

(Continued)

FOREIGN PATENT DOCUMENTS

DE   198 50 374   5/2000

(Continued)

*Primary Examiner*—Dirk Wright
(74) *Attorney, Agent, or Firm*—Oblon, Spivak, McClelland, Maier & Neustadt, P.C.

(57) ABSTRACT

A shift device, which sends a command signal to an electric actuator for shifting a plurality of gear ranges of a transmission of a vehicle by the electric actuator. The gear ranges include a plurality of drive ranges and a parking range. A shift lever is arranged to move between a neutral position and a plurality of manipulation positions located about the neutral position. A restoration mechanism restores the shift lever to the neutral position. A first sensor electrically detects a manipulation performed to select one of the drive ranges. A second sensor electrically detects a manipulation performed to select the parking range. The first sensor detects toward which of the manipulation positions the shift lever is manipulated.

6 Claims, 12 Drawing Sheets

U.S. PATENT DOCUMENTS

| | | | |
|---|---|---|---|
| 5,265,022 A | 11/1993 | Chonan et al. | |
| 5,497,847 A | 3/1996 | Ota et al. | |
| 5,696,679 A | 12/1997 | Marshall et al. | |
| 5,816,100 A * | 10/1998 | Fowler et al. | 74/335 |
| 5,832,777 A * | 11/1998 | Weilant | 74/335 |
| 6,149,546 A | 11/2000 | Tabata et al. | |
| 6,190,284 B1 | 2/2001 | Kuroda et al. | |
| 6,256,568 B1 | 7/2001 | Siepker et al. | |
| 6,321,530 B1 | 11/2001 | Hoshi et al. | |
| 6,371,889 B1 | 4/2002 | Kuroda et al. | |
| 6,422,104 B1 * | 7/2002 | Kamiya | 74/335 |
| 6,948,582 B1 * | 9/2005 | Shiomi et al. | 180/315 |

FOREIGN PATENT DOCUMENTS

| | | |
|---|---|---|
| DE | 199 60 334 | 7/2000 |
| EP | 0 972 667 | 1/2000 |
| JP | 50-47066 | 4/1975 |
| JP | 59-47769 | 3/1984 |
| JP | 60-168629 | 11/1985 |
| JP | 60-171785 | 11/1985 |
| JP | 61-97037 | 6/1986 |
| JP | 63-69628 | 5/1988 |
| JP | 63-37729 | 7/1988 |
| JP | 63-115833 | 7/1988 |
| JP | 1-172033 | 7/1989 |
| JP | 1-117926 | 8/1989 |
| JP | 3-157557 | 7/1991 |
| JP | 04302770 | 10/1992 |
| JP | 4-123821 | 11/1992 |
| JP | 5-124451 | 5/1993 |
| JP | 5-248523 | 9/1993 |
| JP | 5-262152 | 10/1993 |
| JP | 6-235453 | 8/1994 |
| JP | 6-262956 | 9/1994 |
| JP | 7-52675 | 2/1995 |
| JP | 8-132903 | 5/1996 |
| JP | 8-210495 | 8/1996 |
| JP | 9-20153 | 1/1997 |
| JP | 10-38064 | 2/1998 |
| JP | 10-89451 | 4/1998 |
| JP | 10-141489 | 5/1998 |
| JP | 10-153254 | 6/1998 |
| JP | 10-230758 | 9/1998 |
| JP | 11-78576 | 3/1999 |
| JP | 2000-74211 | 3/2000 |
| JP | 2000-97337 | 4/2000 |
| JP | 2000-318476 | 11/2000 |
| JP | 2002-254954 | 9/2002 |

* cited by examiner

SHIFT DEVICE FOR VEHICLE

BACKGROUND OF THE INVENTION

The present invention relates to a shift device that electrically controls shifting of a number of gear ranges of an automatic transmission installed in a vehicle.

The gear ranges of an automatic transmission for a vehicle, such as a P (parking) range, an R (reverse) range, an N (neutral) range, and a D (drive) range, are switched by a manual valve. A shift device for the automatic transmission includes a shift lever. When the shift lever is manipulated, the shift lever moves between gear positions located in order on a substantially straight line. The shift lever is directly connected to the manual valve through, for example, a link or a wire mechanically. Therefore, a manipulation force greater than or equal to a predetermined value is required to switch the manual valve by the manipulation of the shift lever. Thus, to apply the principle of leverage, the length of the shift lever needs to be greater than or equal to a predetermined value. In such shift device, the shift lever is only manipulated linearly and requires a large space for manipulating the shift lever. Also, the installation position of the shift device is limited to a place where a link or a wire can be arranged, such as on the floor adjacent to the driver's seat or on the steering column.

To reduce the force required for manipulation and to reduce the size of the shift device, a gear shifting device for an automatic transmission is proposed in Japanese Examined Patent Publication No. 63-37729. According to the device of the above publication, a manual valve in the automatic transmission is controlled by a wire to shift drive gear ranges. The wire is driven by an electric motor and the electric motor is actuated in accordance with the manipulation of a number of electric switches.

According to the shift device structured as above, a driver can shift the gear range of the automatic transmission by manipulating the electric switches with a small force and the size of the shift device is reduced. Also, the shift device is not required to be mechanically connected to the automatic transmission. Therefore, the shift device can be located at any position in the passenger compartment.

However, to reliably select a desired gear range of the shift device of the above publication, the electrical switches must be manipulated carefully. This hinders the operability of the shift device.

To solve such problems, Japanese laid-open publication No. 3-157557 discloses a gear shifting device for an automatic transmission. The gear shifting device is provided with a shift device, which has a stroke contact type manipulation switch. The contact points of the manipulation switch are located adjacent to one another along a predetermined track. Since the shift device of above publication is provided with the stroke contact type manipulation switch, the size of the shift device is reduced and the shift device can be placed at any position. According to the above shift device, a driver can confirm the current gear range by a gear range indicator arranged on, for example, an instrument panel. Thus, the drive can manipulate the manipulation switches intuitively.

However, the shift device of the publication No. 3-157557 is provided with the stroke contact type manipulation switch and the manipulation positions are located adjacent to one another along the predetermined track. Therefore, if a driver manipulates the manipulation switch too fast, the switch could slide past a desired manipulation position. Therefore, a driver cannot manipulate the manipulation switch promptly. Thus, the operability of the shift device is insufficient.

The objective of the present invention is to provide a miniaturized shift device that has an improved flexibility of installation position and an improved operability.

Further objective of the present invention is to provide a shift device that prevents the assumption of a driver related to the setting of a gear range of an automatic transmission being different from the actual state of the gear range so that the driver is not disturbed.

BRIEF SUMMARY OF THE INVENTION

To achieve the foregoing objective, the present invention provides a shift device for a vehicle. The shift device sends a command signal to an electric actuator for shifting a plurality of gear ranges of a transmission of a vehicle by the electric actuator. The gear ranges include a plurality of drive ranges and a parking range. The shift device includes a shift lever, a restoration mechanism, a first sensor, and a second sensor. The shift lever is arranged to move between a neutral position and a plurality of manipulation positions located about the neutral position. The restoration mechanism restores the shift lever to the neutral position. The first sensor electrically detects a manipulation performed to select one of the drive ranges. The second sensor electrically detects a manipulation performed to select the parking range. At least the first sensor detects toward which of the manipulation positions the shift lever is manipulated.

The present invention also provides a shift device of a vehicle. The shift device includes a gear range shifting mechanism, an actuator, manipulation range detecting means, actual gear range detecting means, a controller, and manipulation range indicating means. The gear range shifting mechanism is actuated to mechanically shift gear ranges of a transmission. The actuator actuates the gear range shifting mechanism. The manipulation range detecting means detects a manipulation range. The manipulation range represents manipulation of a shift manipulation portion by a driver. The actual gear range detecting means detects the actual gear range of the transmission. The controller shifts the actual gear ranges of the transmission by controlling the actuator in accordance with detection signals from the manipulation range detecting means and the actual gear range detecting means. The manipulation range indicating means indicates the manipulation range based on the detection signal from the manipulation range detecting means. The manipulation range indicating means allows to indicate that the manipulation range does not correspond to the detection signal from the manipulation range detecting means.

Other aspects and advantages of the present invention will become apparent from the following description, taken in conjunction with the accompanying drawings, illustrating by way of example the principles of the invention

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which:

FIG. 7 (b) is a plan view illustrating the shift device shown in FIG. 7 (a);

FIG. 9 (b) is a plan view illustrating a structure of an instrument panel;

DETAILED DESCRIPTION OF THE INVENTION

First Embodiment

A first embodiment of the present invention will now be described with reference to FIGS. 1 to 6.

Figure 5:
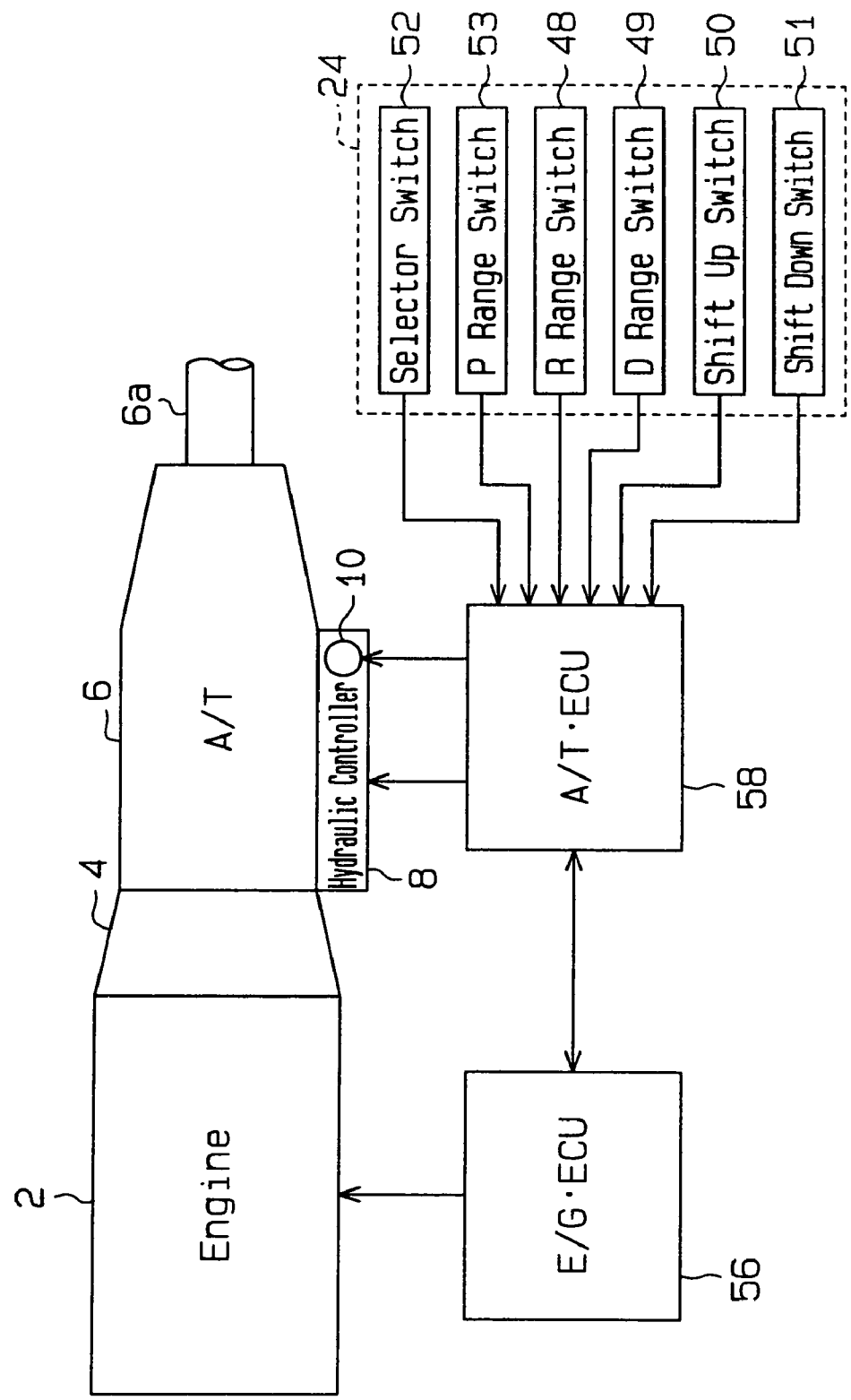
FIG. 5 is a schematic diagram illustrating a vehicle, which is provided with an automatic transmission, and a controller according to the first embodiment.

FIG. 5 is a schematic diagram illustrating a vehicle that is provided with an automatic transmission and its controller according to the first embodiment.

As shown in FIG. 5, an output shaft (not shown) of an engine 2 is connected to a torque converter 4. The torque converter 4 adjusts and transmits the rotational torque of the output shaft of the engine 2 to an automatic transmission (hereinafter, referred to as A/T) 6 through a fluid.

A hydraulic controller 8 within the A/T 6 includes an electric actuator, which is a motor 10 in the first embodiment, for shifting gear ranges. The motor 10 is controlled by an electronic control unit (ECU) for automatic transmission (A/T ECU) 58, which controls the hydraulic pressure of the hydraulic controller 8 within the A/T 6.

Figure 6:
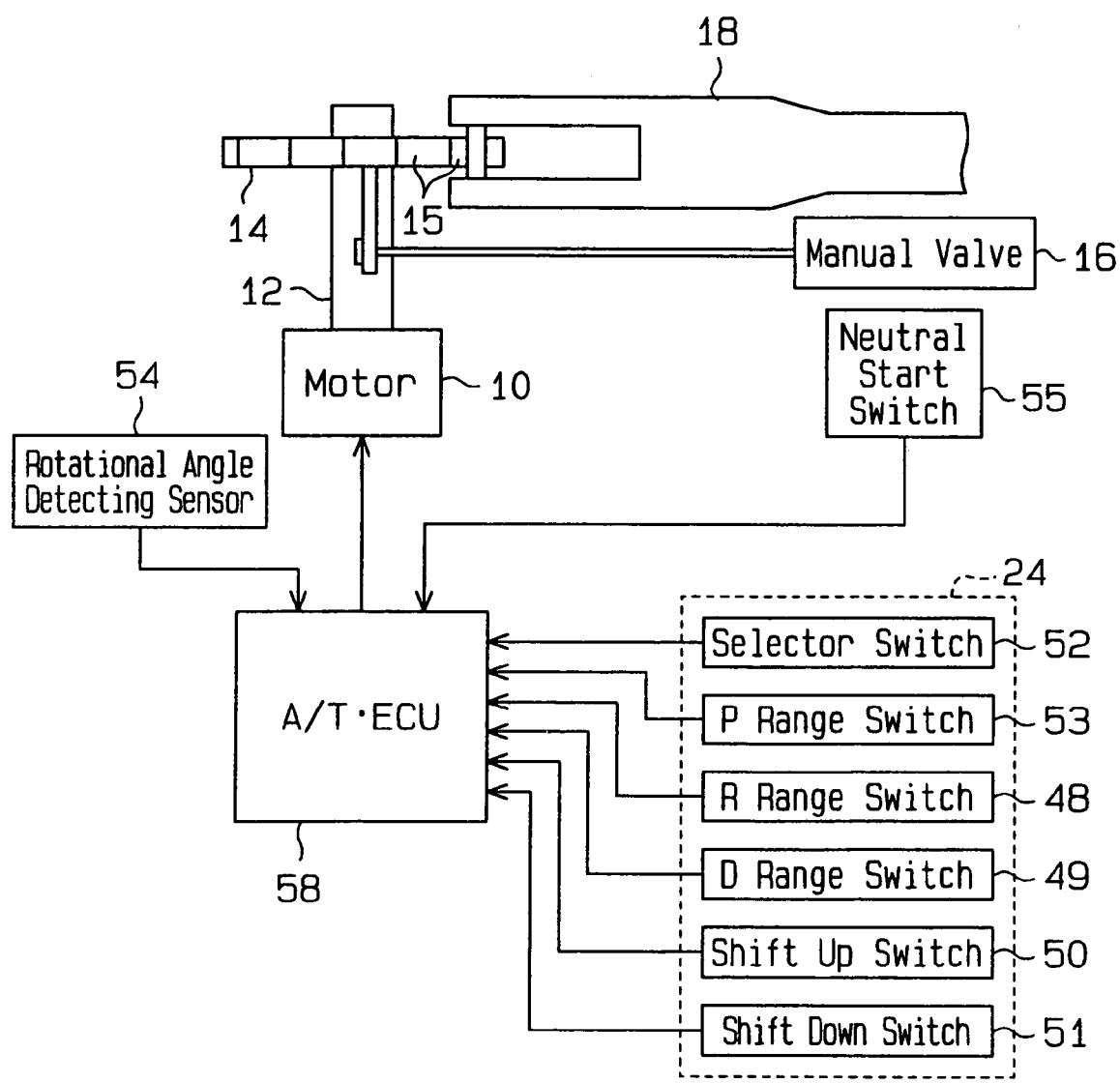
FIG. 6 is a partial schematic diagram illustrating the controller according to the first embodiment.

As shown in FIG. 6, an outer lever 12 extends through a housing (not shown) of the hydraulic controller 8. The outer lever 12 is coupled to an output shaft (not shown) of the motor 10. A detent plate 14 is integrally formed with the outer lever 12. The detent plate 14 is coupled to a manual valve 16, which shifts the gear ranges of the A/T 6 by changing the destination of the supply of the oil pressure. Therefore, when the outer lever 12 is rotated clockwise or counterclockwise by the motor 10, the position of the manual valve 16 is shifted through the detent plate 14. Thus, the gear range is shifted between, for example, a P (parking) range, an R (reverse) range, an N (neutral) range, and a D (drive) range.

A number of detent grooves 15 are formed at the peripheral portion of the detent plate 14 for determining the gear position. The distal end of a detent spring 18 is elastically pressed against the peripheral portion of the detent plate 14. Therefore, the distal end of the detent spring 18 is engaged with one of the detent grooves 15 of the detent plate 14. The engagement causes an operator to feel changes in the force applied when manipulating the shift lever and also determines the gear range of the A/T 6.

Figure 1:
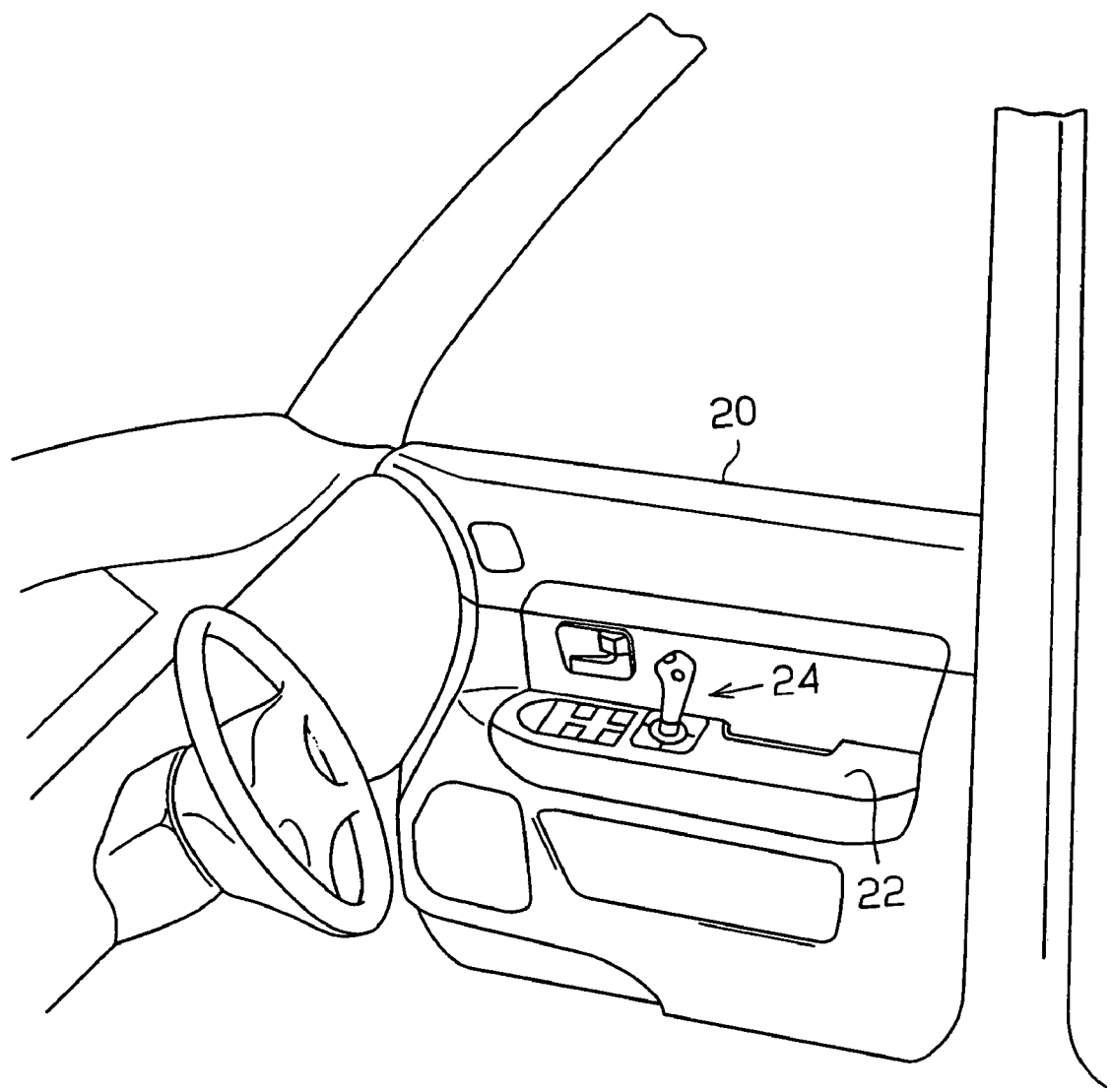
FIG. 1 is a diagram illustrating a shift device according to a first embodiment of the present invention.

As shown in FIG. 1, a shift device 24 for shifting the gear ranges of the A/T 6 is arranged on an armrest 22 of a door 20 next to the driver's seat in a vehicle compartment.

Figure 2:
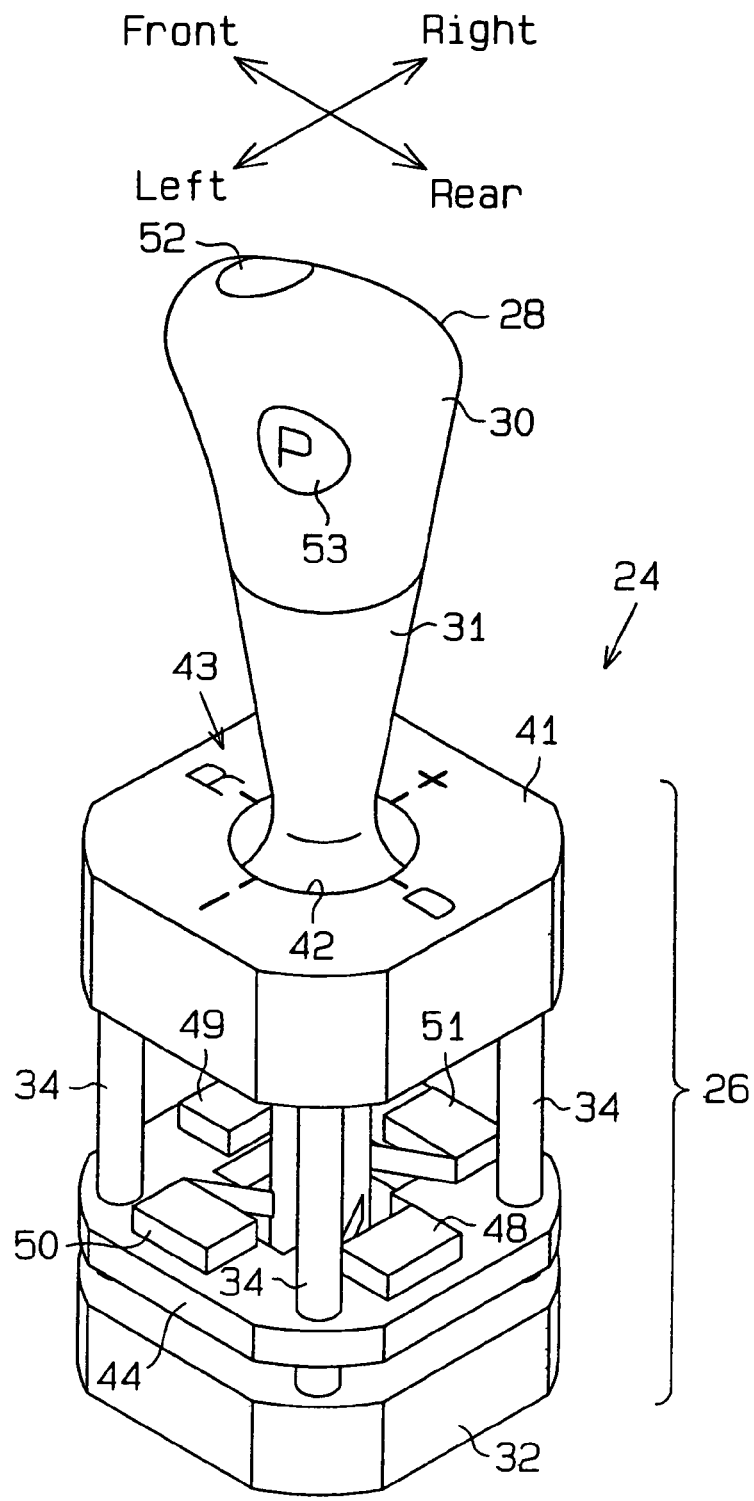
FIG. 2 is a perspective view illustrating the shift device shown in FIG. 1.
Figure 3:
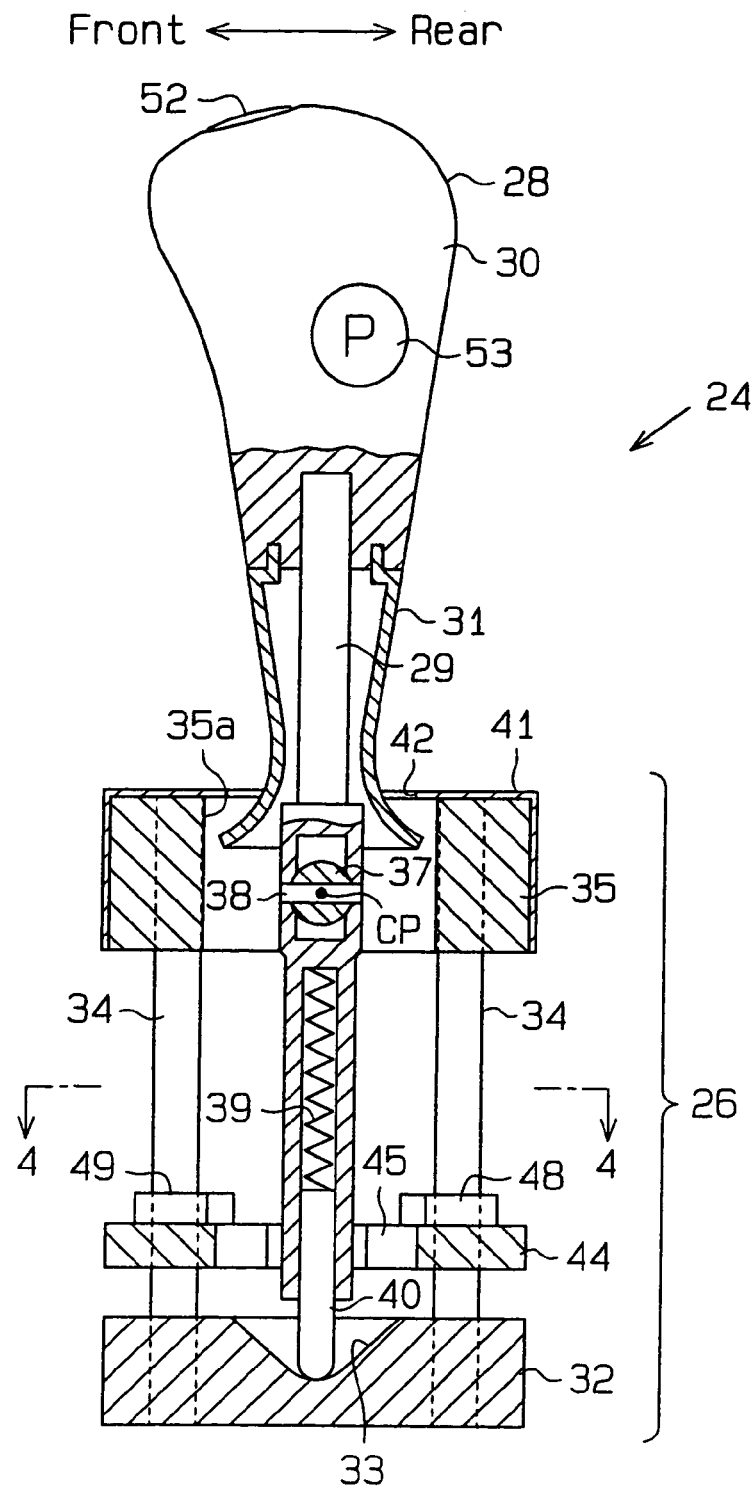
FIG. 3 is a front view, with a part cut away, illustrating the shift device shown in FIG. 1.

As shown in FIGS. 2 and 3, the shift device 24 includes a main body 26 and a shift lever 28, which extends upward from the center of the main body 26. A number of support legs 34 (Four support legs are provided in the first embodiment) are located on a base portion 32 of the main body 26. A guide plate 44, which has a guide groove 45, is fixed at the middle of the support legs 34. A mounting frame 35, which has a bore 35a, is fixed at the upper end portion of the support legs 34. The shift lever 28 is arranged on mounting frame 35 and can be tilted with respect to the mounting frame 35.

The shift lever 28 includes a shift rod 29 and a manipulation knob 30, which is fixed on the upper end of the shift rod 29. A skirt portion 31 covers the periphery of the shift rod 29 at the lower end of the manipulation knob 30.

The shift rod 29 extends through the bore 35a of the mounting frame 35 and the guide groove 45 of the guide plate 44. The shift rod 29 is rotatably supported by a support pin 37, which is attached to the mounting frame 35. The shift rod 29 is also rotatably supported by a support pin 38, which is perpendicular to the support pin 37. Therefore, the shift rod 29 can be tilted to any arbitrary direction about the center point CP, which is the intersecting point of the support pin 37 and the support pin 38, the two pins acting as a supporting member.

A plunger 40 is arranged on the distal end of the shift rod 29 through a detent spring 39. The plunger 40 projects or retracts from the distal end of the shift rod 29 by means of the detent spring 39. The force of the detent spring 39 presses the plunger 40 against the base portion 32. A recess 33 is formed on the base portion 32. The recess 33 is engaged with the plunger 40 and keeps the shift rod 29 in position. The recess 33 is formed directly below the center point CP. The distance between the center point CP and the center portion of the recess 33 is the greatest. The distance from the center point CP to the recess 33 decreases toward the peripheral portion of the recess 33. In the first embodiment, the detent spring 39 and the plunger 40 arranged on the shift rod 29 and the recess 33 of the base portion 32 form a restoration mechanism for restoring the shift lever 28 to a neutral position.

Therefore, as shown in FIG. 3, if the shift lever 28 is tilted, for example, forward, the plunger 40 is pressed by the inner surface of the recess 33 and is retracted in the shift rod 29. Thus, the shift lever 28 can be tilted. In this state, if the shift lever 28 is released, the plunger 40 projects from the shift rod 29 by the force of the detent spring 39. The plunger 40 thus presses the inner surface of the recess 33. This force restores the shift lever 28 to the neutral position as shown in FIG. 3.

Figure 4:
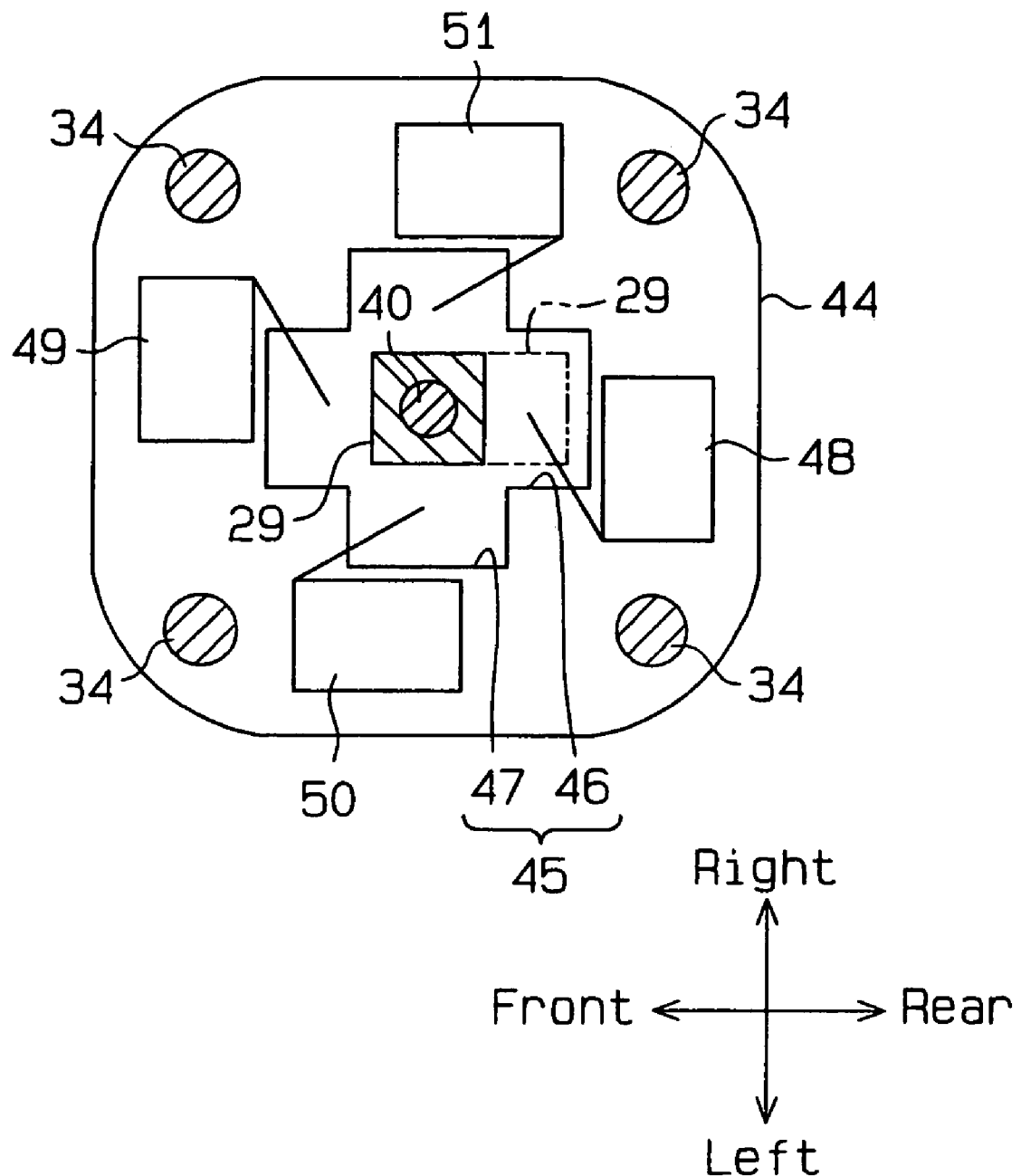
FIG. 4 is a cross-sectional view taken along line 4—4 shown in FIG. 3.

As shown in FIG. 4, the guide groove 45 of the guide plate 44 includes a first guide groove 46 and a second guide groove 47, which intersect each other to form a cruciform shape. The first and second guide grooves 46, 47 guide and restrict the moving direction of the shift rod 29. The first guide groove 46 extends in the front and rear direction of the vehicle and the second guide groove 47 extends in the left and right direction of the vehicle. A D range switch 49 is located at the front side of the first guide groove 46 and an R range switch 48 is located at the rear side of the first guide groove 46. A shift up switch 50 is located at the left side of the second guide groove 47 and a shift down switch 51 is located at the right side of the second guide groove 47.

In the first embodiment, a limit switch is used for each of the R range switch 48, the D range switch 49, the shift up switch 50, and the shift down switch 51. The shift rod 29 is manipulated when the shift lever 28 is inclined. Each of the R range switch 48, the D range switch 49, the shift up switch 50, and the shift down switch 51 electrically detects the manipulation of the shift rod 29 and outputs a command signal for shifting the motor 10.

As shown in FIGS. 2 and 3, an operation panel 41 is located on the mounting frame 35 of the shift device 24. The skirt portion 31 of the shift lever 28 extends through the operation panel 41. An index guide 43 is arranged about the circumferential portion of a through hole 42 on the operation panel 41. The index guide 43 indicates a number of manipulation positions of the shift lever 28. Each of the manipulation positions corresponds to one of the R range switch 48, the D range switch 49, the shift up switch 50, and the shift down switch 51. That is, an R (reverse) position is located on the front side of the vehicle and a D (drive) position is located on the rear side of the vehicle. Also, a negative (shift down) position is located on the left side of the vehicle and a positive (shift up) position is located on the right side of the vehicle. The negative (−) and positive (+) positions are used for selecting each of forward drive gear ranges (3, 2, and L) other than the D range. The R position and the D position are arranged on a first straight line with the neutral position in between. The positive position and the negative position are arranged on a second straight line with the neutral position in between. Thus, the second straight line is perpendicular to the first straight line.

A P range switch (manipulation switch) 53 for selecting a P (parking) range of the A/T 6 is arranged at the substantial center of the side surface of the manipulation knob 30 of the shift lever 28. The P range switch 53 is located such that a driver can easily manipulate with the right thumb while grasping the manipulation knob 30 with the right hand. Furthermore, a selector switch 52 is arranged on the upper surface and front side of the manipulation knob 30. The selector switch 52 validates the manipulation of the shift lever 28. In other words, the selector switch 52 validates a detection signal from the R range switch 48, the D range switch 49, the shift up switch 50, and the shift down switch 51.

As shown in FIG. 5, the vehicle according to the first embodiment includes an engine ECU (E/G•ECU) 56 and the A/T•ECU 58 as an electronic control unit (ECU). The E/G•ECU 56 mainly controls the engine 2. The A/T ECU 58 mainly controls the A/T 6. Each of the E/G•ECU 56 and the A/T•ECU 58 is electrically connected to each other through a vehicle network line.

A microcomputer is mainly used for the E/G•ECU 56. The E/G•ECU 56 controls the engine 2 in a suitable manner by driving a fuel injection valve, an igniter, and other actuators based on, for example, detection signals from various sensors.

The A/T•ECU 58 receives detection signals from the R range switch 48, the D range switch 49, the shift up switch 50, the shift down switch 51, the selector switch 52, and the P range switch 53 of the shift device 24.

As shown in FIG. 6, the A/T•ECU 58 receives detection signals from a rotational angle detecting sensor 54 and a neutral start switch 55. The rotational angle detecting sensor 54 detects the rotational angle of the motor 10. The neutral start switch 55 detects the actual position of the manual valve 16.

A microcomputer is used for the A/T•ECU 58. The A/T ECU 58 includes a read only memory (ROM), a central processing unit (CPU), and a random access memory (RAM). The ROM stores a program required for processing various software related to the gear range shifting of the A/T 6 and the automatic gear shifting for forward drive gear ranges. The CPU executes the programs and the parameters required for the programs are temporarily stored in the RAM.

When the shift device 24 is manipulated, each of the R range switch 48, the D range switch 49, the shift up switch 50, the shift down switch 51, the selector switch 52, and the P range switch 53 sends a detection signal to the A/T•ECU 58. The A/T•ECU 58 then drives the motor 10 based on the detection signal and shifts the position of the manual valve 16, which then shifts gears of the A/T 6.

The combination of input signals generated by the manipulation of the shift lever 28 of the shift device 24 and the manipulation of the P range switch 53 and the selector switch 52 sets manipulation patterns of the gear shift of the manual valve 16. The manipulation patterns are listed in Table 1 below.

TABLE 1

| Operation Pattern | Shift Lever Operation | Switch Operation |
|---|---|---|
| P → R | Tilt Forward | Press Selector Switch |
| P → D | Tilt Rearward | Press Selector Switch |
| R → D | Tilt Rearward | None |
| R → P | None | Press P Range Switch |
| D → P | None | Press P Range Switch |
| D → R | Tilt Forward | Press Selector Switch |
| D → 3rd | Tilt Leftward | None |
| D → 2nd | Tilt Leftward Twice | None |
| D → L | Tilt Leftward Three Times | None |
| 3rd → L | Tilt Leftward Twice | None |
| 3rd → 2nd | Tilt Leftward | None |
| 3rd → D | Tilt Rightward or Tilt Rearward | None |
| 3rd → R | Tilt Forward | Press Selector Switch |
| 3rd → P | None | Press P Range Switch |
| 2nd → L | Tilt Leftward | None |
| 2nd → 3rd | Tilt Rightward | None |
| 2nd → D | Tilt Rightwrd Twice or Tilt Rearward | None |
| 2nd → R | Tilt Forward | Press Selector Switch |
| 2nd → P | None | Press P Range Switch |
| L → 2nd | Tilt Rightward | None |
| L → 3rd | Tilt Rightward Twice | None |
| L → D | Tilt Rightward Three Times or Tilt Rearward | None |
| L → R | Tilt Forward | Press Selector Switch |
| L → P | None | Press P Range Switch |

The first embodiment has the following advantages.

According to the shift device 24 of the first embodiment, the shift lever 28 moves between the neutral position and the R position and between the neutral position and the D position. The shift lever 28 also moves between the neutral position and the positive position and between the neutral position and the negative position. When the shift lever 28 is released, the shift lever 28 is restored to the neutral position by the restoration mechanism (the detent spring 39, the plunger 40, and the recess 33 of the base portion 32). Therefore, the space required for manipulating the lever is reduced and thus the size of the shift device 24 is reduced.

The manipulation of the shift lever 28 to each manipulation position is electrically detected by detection switches, which are the R range switch 48, the D range switch 49, the shift up switch 50, and the shift down switch 51. The selection of the parking range is electrically detected by the P range switch 53. Therefore, it is not required to mechanically connect the shift device 24 and the A/T 6. Thus, the shift device 24 can be arranged at any position within the vehicle compartment. Particularly, in the first embodiment, the shift device 24 is arranged on the armrest 22 of the door 20 next to the driver's seat. Therefore, the manipulation of the steering wheel does not interfere with the manipulation of the shift device 24. Thus, the operability of the shift device 24 is improved.

The shift device 24 is located at the peripheral portion of the vehicle compartment, that is, on the door 20 next to the driver's seat. Therefore, the shift device 24 is not an obstacle for occupants. Thus, the shift device 24 will not be manipulated unintentionally and the space in the vehicle compartment is effectively used.

Furthermore, each of the manipulation positions of the shift lever 28 is assigned for one of the drive gear ranges. Therefore, even when the lever is manipulated quickly, the desired drive gear range is easily and reliably selected.

In addition, the R position and the D position of the shift lever 28 are located on the first straight line and the positive position and the negative position are located on the second straight line, which is perpendicular to the first straight line. Therefore, a driver can manipulate the shift lever 28 intuitively without carefully looking at the shift lever 28. This improves the operability of the shift device 24 and the running performance of a vehicle.

The R range switch 48, the D range switch 49, the shift up switch 50, and the shift down switch 51, each of which is a limit switch, are arranged in correspondence with the manipulation positions (R, D, +, −) of the shift lever 28. Therefore, the durability of the detection switches is improved. Also, each of the R range switch 48, the D range switch 49, the shift up switch 50, and the shift down switch 51 can be replaced separately in the case of a failure. This facilitates the maintenance of the shift lever 28.

According to the shift device 24 of the first embodiment, the P range switch 53, which is used for selecting the parking position, is arranged on the shift lever 28. Therefore, the P range switch 53 is easily manipulated and the size of the shift device 24 is reduced.

A second embodiment of the present invention will now be described with reference to FIGS. 7 (a) and 7 (b). The structure of the controller of the A/T in the shift device 24 according to the second embodiment is different from that of the first embodiment. Other structures are the same as that of the first embodiment. Therefore, like members are given the like numbers and detailed explanations are omitted.

Figures 7A, 7B:
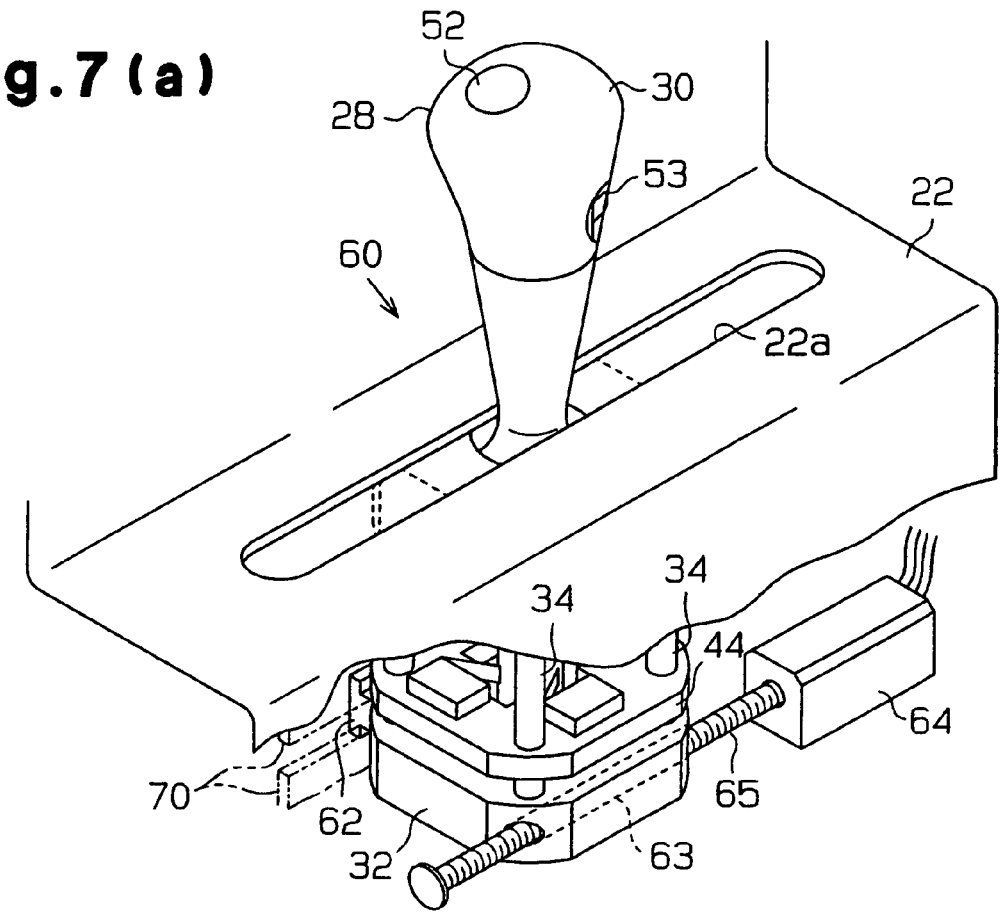
FIG. 7 (a) is a perspective view, with a part cut away, illustrating an arrangement of a shift device according to a second embodiment of the present invention.

As shown in FIG. 7 (a), the shift device 60 of the second embodiment is arranged on the armrest 22 of the door (not shown) next to the driver's seat and moves with respect to the armrest 22. An elongated hole 22a is formed on the armrest 22 and extends in the front and rear direction of a vehicle. The shift lever 28 project from the armrest 22 through the elongated hole 22a. A T-shaped protrusion 62 is formed on the base portion 32 of the main body 26. The protrusion 62 is located on a door panel side (not shown) and extends in the front and rear direction of the vehicle. The protrusion 62 slides along a guide rail 70 formed on the door panel (not shown). Also, a female screw portion 63 is formed through the base portion 32 opposite to the protrusion 62 and extends in the front and rear direction of the vehicle. A lead screw 65, which is rotated by an electric motor 64, is screwed in the female screw portion 63.

Therefore, the shift device 60 moves along the guide rail 70 in the front and rear direction of the vehicle through the engagement of the lead screw 65 and the female screw portion 63 when the lead screw 65 is rotated to one direction or the other by the electric motor 64. In the second embodiment, the protrusion 62, the guide rail 70, the female screw portion 63, the electric motor 64, and the lead screw 65 form the movement mechanism.

According to the shift device 60, only the shift lever 28 projects through the elongated hole 22a. Therefore, as shown in FIG. 7 (b), an index guide 67, which shows the manipulation positions, is arranged on the top surface of the manipulation knob 30. The index guide 67 includes a manipulation position corresponding to each of the R range switch 48, the D range switch 49, the shift up switch 50, and the shift down switch 51. That is, the index guide 67 includes an R (reverse) position and a D (drive) position arranged in the front and rear direction of the vehicle and a negative (shift down) position and a positive (shift up) position arranged in the left and right direction of the vehicle for selecting forward drive gear ranges (3, 2, and L) other than the D range.

The second embodiment has following advantages in addition to the advantages of the first embodiment.

The shift device 60 is arranged to move with respect to the armrest 22 of the door next to the driver's seat. Therefore, the shift device 60 can be located at any desired position and thus the operability of the shift device 60 is improved.

The first and the second embodiments may be modified as follows.

The shift device 24 according to the first embodiment may be located on the steering column.

The shift device 24 according to the first embodiment is located on the door next to the driver's seat. However, the shift device 24 may be located on the floor on the left side of the driver's seat to be moved in the front and rear direction of a vehicle by a movement mechanism.

A lift mechanism may be applied to the armrest 22 for the shift device 24, 60 according to the first and second embodiments. In this case, the shift device 24, 60 is selectively projected from and retracted in the armrest 22. Therefore, the shift device 24, 60 can be stored in the armrest 22 when a driver gets off the vehicle. Thus, the door 20 next to the driver's seat is easily opened or closed.

Third Embodiment

A third embodiment of the present invention will now be described with reference to FIGS. 8 to 11.

Figure 8:
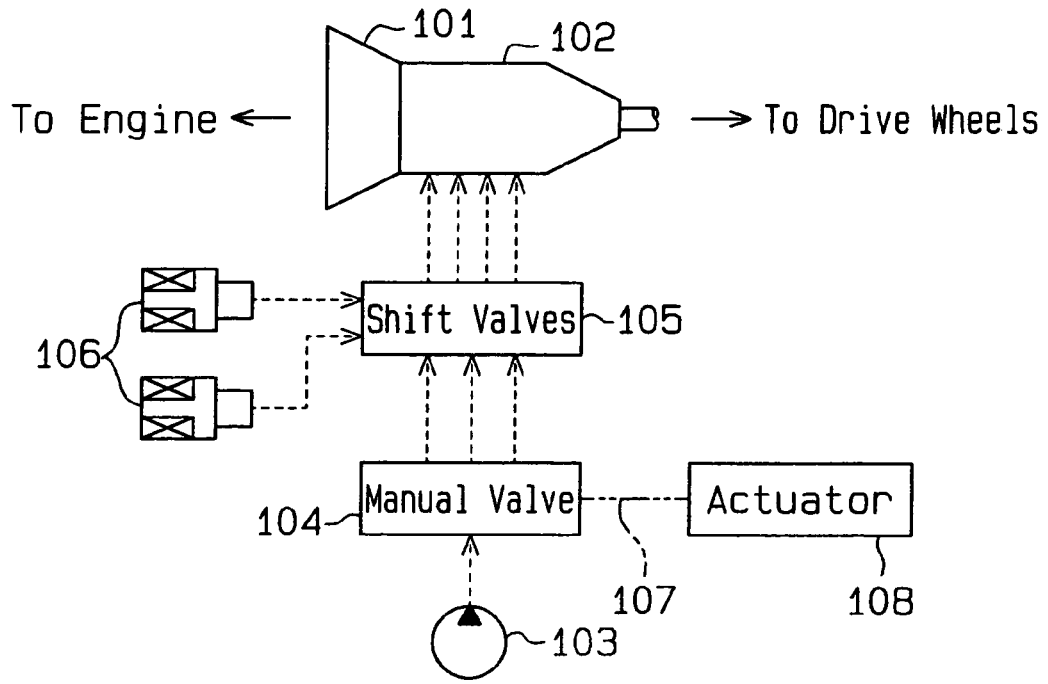
FIG. 8 is a view showing a frame format of a hydraulic circuit of an automatic transmission according to a third embodiment of the present invention.

FIG. 8 is a view showing a frame format of the structure of an automatic transmission (AT) according to the third embodiment.

As shown in FIG. 8, the AT includes a fluid type torque converter 101 and a gear type transmission mechanism 102. The gear is shifted in the gear type transmission mechanism 102 to select the forward or the rearward drive or to change the gear ratio. The AT according to the third embodiment has four gears (first gear to fourth gear) for forward drive and a reverse gear.

The hydraulic controller for shifting gears includes a number of hydraulic lines. The hydraulic lines are connected to, for example, a clutch for the gear shift, which is built in the gear type transmission mechanism 102, or a brake and transmits the hydraulic pressure (line pressure) generated by an oil pump 103. The hydraulic controller includes a manual valve 104 (gear range shifting mechanism) and a number of shift valves 105, which function as a mechanism for changing combination of the hydraulic lines.

The oil controller of the AT includes a number of shift solenoids 106 (only two shift solenoids 106 are shown in FIG. 8) each of which corresponds to one of the shift valves 105. Each shift solenoid 106 applies the hydraulic pressure (pilot pressure) to the corresponding shift valve 105 in accordance with the current supply control.

The manual valve 104 changes the basic combination of the hydraulic lines for setting the gear ranges that can be selected in the gear type transmission mechanism 102, that is, the gear range of the AT. The gear range of the AT can be shifted in the range set by the manual valve 104 in accordance with the combination of the state of the current supply control of each shift solenoid 106.

The gear range of the AT can be set as follows. The AT is set to a neutral state in the N range and the P range. When the AT is set to the neutral state, the power transmission between the engine side and the drive wheel side of the gear type transmission mechanism 102 is disconnected. When the gear is set to the P range, the parking lock is actuated to mechanically fix the rotation of a shaft in the transmission mechanism 102 that is connected to the drive wheels.

The example of the gear ranges of the AT is listed below.

| | |
|---|---|
| Drive (D) range | first gear to fourth gear can be selected. |
| Third (3rd) range | first gear to third gear can be selected. |
| Second (2nd) range | first gear and second gear can be selected. |
| Low (L) range | Fixed to first gear. |
| Reverse (R) range | Fixed to reverse gear. |
| Neutral (N) range | Neutral state |
| Parking (P) range | Neutral state Parking lock is actuated. |

According to the third embodiment, the actuation position of the manual valve 104 is shifted by an actuator 108, which is connected to the manual valve 104 through a mechanical link mechanism 107. The electric motor is used as the actuator 108 in the third embodiment. A shift device that employs shift-by-wire systems is used in the third embodiment. In the above mentioned shift device, the actuator 108 is controlled in accordance with the detection signals, which indicates the manipulation state of the shift manipulation portion at the driver's seat. This shifts the gear range of the AT.

Figure 9A:
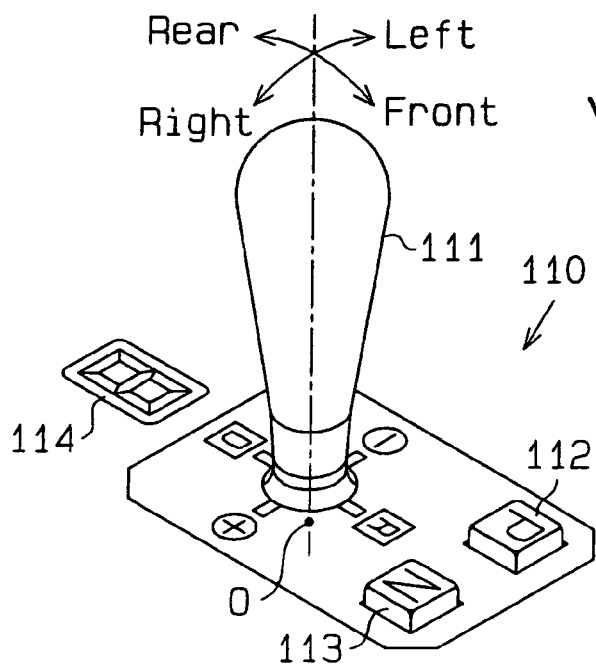
FIG. 9 (a) is a perspective view illustrating a shift manipulation portion.
Figure 9B:
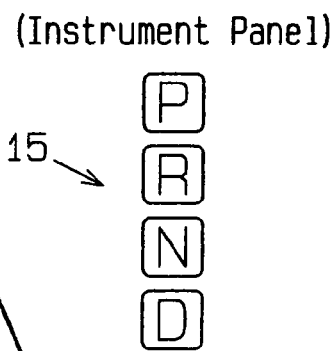

FIG. 9 (a) shows an example of the shift manipulation portion. A shift manipulation portion 110 includes a joystick type shift lever 111 and two pushbuttons, or a P button 112 and an N button 113.

As shown in FIG. 9 (a), the shift lever 111 can be tilted forward, backward, leftward, and rightward about a point O at its proximal portion. When a driver tilts the shift lever 111 forward, the gear is shifted to the R range and when a driver tilts the shift lever 111 backward, the gear is shifted to the D range. Also, when the forward range other than the L range is selected, that is, when any of the D range, the 3rd range, and the 2nd range is selected, the gear range of the AT can be shifted one step down to a slower range (D→3rd→2nd→L) by tilting the shift lever 111 leftward. Also, when the forward range other than the D range is selected, the gear range of the AT is shifted one step up to a faster range by tilting the shift lever 111 rightward (L→2nd→3rd→D).

The shift lever 111 is urged to maintain the neutral position and not tilted in any direction. Therefore, if a driver releases the shift lever 111 after manipulation, the shift lever 111 is automatically restored to the neutral position.

According to the shift manipulation portion 110, the AT is set to the P range by pressing the P button 112 three times or to the N range by pressing the N button 113 three times. The P button 112 and the N button 113 are also urged to be automatically restored after manipulation.

According to the third embodiment, the shift manipulation portion 110 further includes a first indicator 114. The first indicator 114 includes segmented indicating lamps, which are selectively turned on and off separately. The first indicator 114 indicates the selected gear range with a sign (such as D, 3, 2, and L) formed by the combination of the indicating lamps.

As shown in FIG. 9 (b), the instrument panel located near the driver's seat also has a second indicator 115. The second indicator 115 includes a number of frames (such as P, R, N, and D), each of which corresponds to one of the gear ranges. One of the frames is selectively lit to indicate the selected gear range to a driver.

Figure 10:
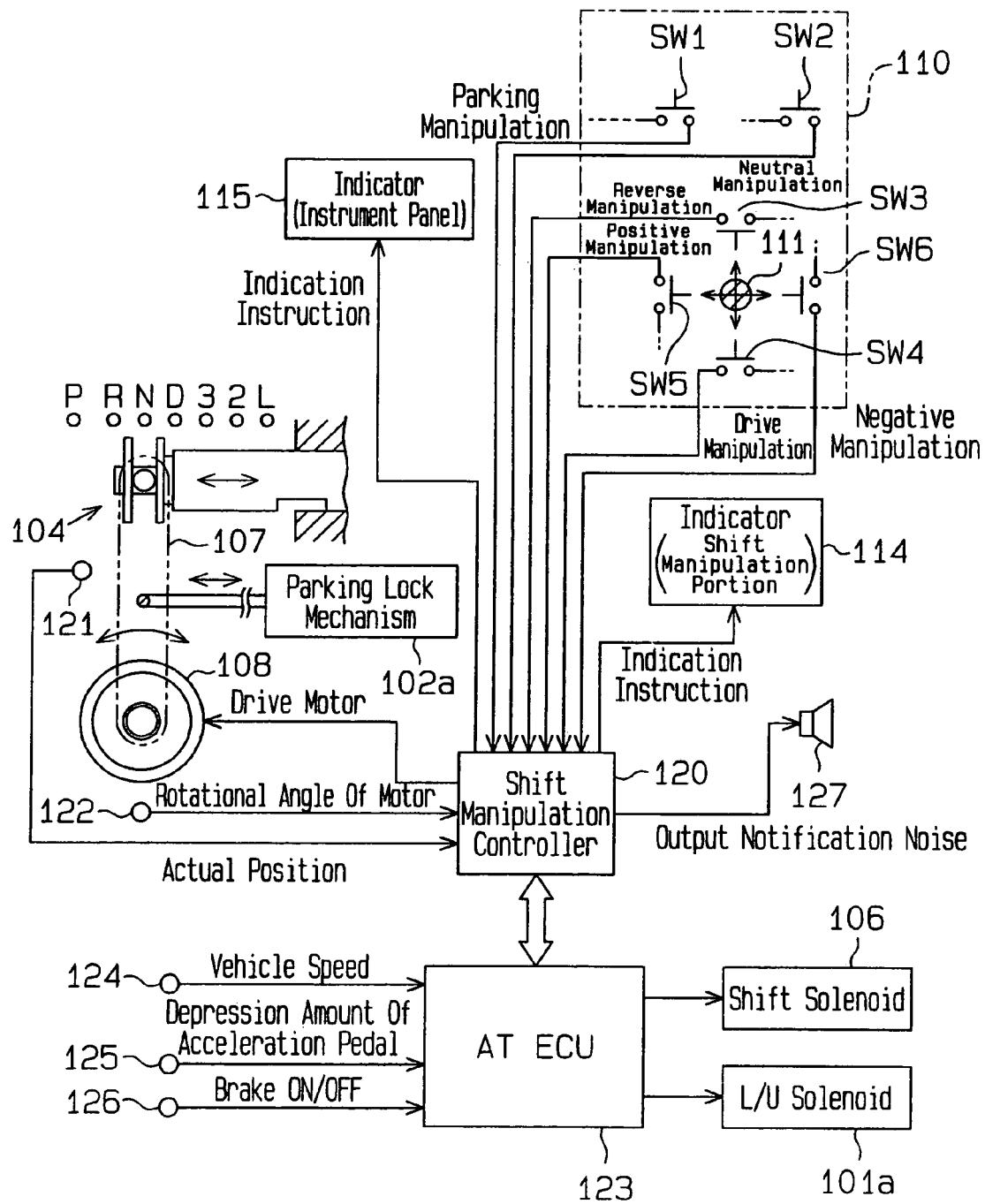
FIG. 10 is a view showing a frame format of an electric structure of the shift device.

FIG. 10 illustrates an electric structure of a control according to the third embodiment, such as shifting the gear range of the AT and the indication of the first and the second indicators 114, 115. FIG. 10 also illustrates a frame format of a structure of an actuation mechanism of the manual valve 104.

As shown in FIG. 10, the control system of the shift device according to the third embodiment is structured with a shift manipulation controller 120 at the center. The shift manipulation controller 120 controls the gear shift of the AT.

The shift manipulation controller 120 includes switches SW1, SW2, SW3, SW4, SW5, and SW6 for sending a manipulation signal in accordance with the manipulation of each of the shift lever 111, P button 112, and N button 113 of the shift manipulation portion 110. Each of the switches SW1 to SW6 sends a manipulation signal to the shift manipulation controller 120 when the corresponding one of the shift lever 111, the P button 112, and the N button 113 is manipulated. The shift manipulation controller 120 determines the manipulation state of the shift manipulation portion 110 according to the received manipulation signal. Therefore, the switches SW1 to SW6 correspond to manipulation range detecting means in the third embodiment.

As shown in FIG. 10, the manual valve 104 is mechanically coupled to the rotational axis of the electric motor type actuator 108 through the link mechanism 107. The manual valve 104 includes an actuation position corresponding to each gear range. The actuation positions of the manual valve 104 are changed in accordance with the rotation of the rotational shaft of the actuator 108, thus shifting the gear range of the AT.

Each of the actuation positions of the manual valve 104 corresponds to one of the gear ranges. The actuation positions are arranged in a predetermined order (In FIG. 10, P, R, N, D, 3rd, 2nd, and L are arranged in this order).

A parking lock mechanism 102a is connected to the link mechanism 107 for performing the parking lock when the P range is selected. The parking lock mechanism 102a actuates and performs the parking lock only when the manual valve 104 is located at the actuation position of the P range.

An actual position sensor 121 and a rotational angle sensor 122 detect the actuation position of the manual valve 104, that is, the actual gear range of the AT. The actual position sensor 121 and the rotational angle sensor 122 are connected to the shift manipulation controller 120. The actual position sensor 121 is located in the vicinity of the link mechanism 107 and detects the actuation position of the link mechanism 107. The rotational angle sensor 122 detects the rotational angle of the rotational axis of the electric motor type actuator 108. The shift manipulation controller 120 determines the actuation position of the manual valve 104, that is, the actual gear range of the AT based on the detection signals from the actual position sensor 121 and the rotational angle sensor 122. Therefore, the actual position sensor 121 and the rotational angle sensor 122 correspond to actual gear range detecting means in the third embodiment.

Furthermore, the shift manipulation controller 120 is also connected to and controls the first and second indicators 114, 115 and a buzzer 127, which generates a notification sound to warn a driver.

The shift manipulation controller 120 according to the third embodiment is structured as an electronic control unit that is separate from the AT electronic control unit 123, which performs the control procedures of AT other than those described above. The AT electronic control unit 123 controls the shifting of gears within the predetermined gear ranges by controlling the current supply to the shift solenoids 106 or performs the actuation control of the torque converter 101 in accordance with the current supply to a lock up (L/U) solenoid 101a.

A vehicle speed sensor 124 for detecting the vehicle speed, an acceleration sensor 125 for detecting the depression amount of the acceleration pedal, and a brake sensor 126 for detecting if the brake pedal is depressed are connected to the AT electronic control unit 123. The AT electronic control unit 123 is also connected to the shift manipulation controller 120 and the information is exchanged between the AT electronic control unit 123 and the shift manipulation controller 120. The AT electronic control unit 123 determines the driving state of the vehicle based on the information received from the vehicle speed sensor 124, the acceleration sensor 125, or the shift manipulation controller 120. Then, the AT electronic control unit 123 performs the above mentioned AT control.

On the other hand, the shift manipulation controller 120 is structured to be able to control the shifting of gear ranges independently without receiving information from the AT electronic control unit 123. That is, the shift manipulation controller 120 independently controls the shifting of the actuation position of the manual valve 104 in accordance with the manipulation of the shift manipulation portion 110 and the indication of the indicators 114, 115.

If information is sent from the AT electronic control unit 123, the shift manipulation controller 120 can perform a more complicated control procedures compared with a case when the AT electronic control unit 123 performs a control procedure independently.

The control of the shift manipulation controller 120 for shifting the gear range of the AT according to the third embodiment structured as above will now be described. The shift manipulation controller 120 controls the shifting of the gear range of the AT as described below.

When a manipulation signal is received from any of the switches SW1 to SW6, the shift manipulation controller 120 detects the manipulation state of the shift manipulation portion 110, or the manipulation range. Then, the shift manipulation controller 120 determines the appropriateness of the shifting of the actual gear range according to the detected manipulation range. The shift manipulation controller 120 determines the appropriateness of the shifting of the actual gear range based on the actual gear range determined in accordance with the detection signals from the actual position sensor 121 and the rotational angle sensor 122 and the driving state of the vehicle received through the AT electronic control unit 123. If the detected manipulation range is inappropriate for the current driving state of the vehicle, the shift manipulation controller 120 determines that it is an invalid manipulation. For example, if a driver selects the R range by manipulating the shift lever 111 when the vehicle is driving forward (actual gear range is D, 3rd, 2nd, or L) at a speed greater than or equal to a predetermined speed (R prohibition speed), the shift manipulation controller 120 determines that the manipulation is invalid. Therefore, the shifting of the actual gear range to the R range is prohibited and the excessive increase of the load on the gear type transmission mechanism 102 is avoided.

If the detected manipulation range is determined to be appropriate, or the manipulation is valid, the shift manipulation controller 120 shifts the actual gear range as described below. That is, the shift manipulation controller 120 drives the actuator 108 such that the actual gear range is consistent with the detected manipulation range with reference to the detection signals from the actual position sensor 121 and the rotational angle sensor 122. Then, the manual valve 104 is driven to the actuation position corresponding to the detected manipulation range and thus the actual gear range of the AT is shifted to the manipulation range.

As mentioned above, the shift lever 111, the P button 112, and the N button 113 of the shift manipulation portion 110 according to the third embodiment are automatically restored after being manipulated. Therefore, it is difficult to confirm the manipulation state from the appearance. Thus, in the third embodiment, the manipulation range is indicated by the first and second indicators 114, 115 to permit a driver to confirm the manipulation state. That is, the shift manipulation controller 120 switches the indication of each of the first and second indicators 114, 115 in sync with the manipulation signals from the switches SW1 to SW6. The indication of each of the first and second indicators 114, 115 is switched to the manipulation range that corresponds to the manipulation signals. Therefore, in the third embodiment, the indicators 114, 115 correspond to manipulation range indicating means.

However, depending on the driving state of the vehicle, the shift manipulation controller 120 determines that the manipulation performed by a driver is invalid and prohibits the shifting of the actual gear range corresponding to the manipulation. Therefore, the manipulation range and the actual gear range are not always consistent. Thus, if the shift device has only the first and second indicators 114, 115, the driver's manipulation state (manipulation range) is clearly acknowledged but the actual gear range of the AT (actual gear range) is difficult to be realized.

Therefore, when the shift manipulation controller 120 prohibits the shifting of the actual gear range corresponding to the manipulation performed by a driver in accordance with the driving state of the vehicle, the shift manipulation controller 120 controls the indication state of each of the first and second indicators 114, 115 as described below. That is, if it is determined that the manipulation of the shift device based on the received manipulation signal is invalid, the shift manipulation controller 120 prohibits the switching of the indication to the manipulation range corresponding to the received manipulation signal. Then, the shift manipulation controller 120 controls each of the first and second indicators 114, 115 to maintain the original gear range indication. This indication control allows a driver to be reliably informed of the manipulation state and prevents the inconsistency between the indication of the first and second indicators 114, 115 and the actual gear range.

Even if it is determined that the manipulation is invalid, a driver might assume that the actual gear range will be shifted corresponding to the manipulation. Therefore, the driver might be disturbed if the indication state of each of the first and second indicators 114, 115 does not change. Thus, it is desirable to inform the driver that the manipulation is cancelled. In the third embodiment, when the shift manipulation controller 120 determines that the manipulation is invalid, the buzzer 127 generates a notification sound to notify the driver that the manipulation has been cancelled.

Figure 11:
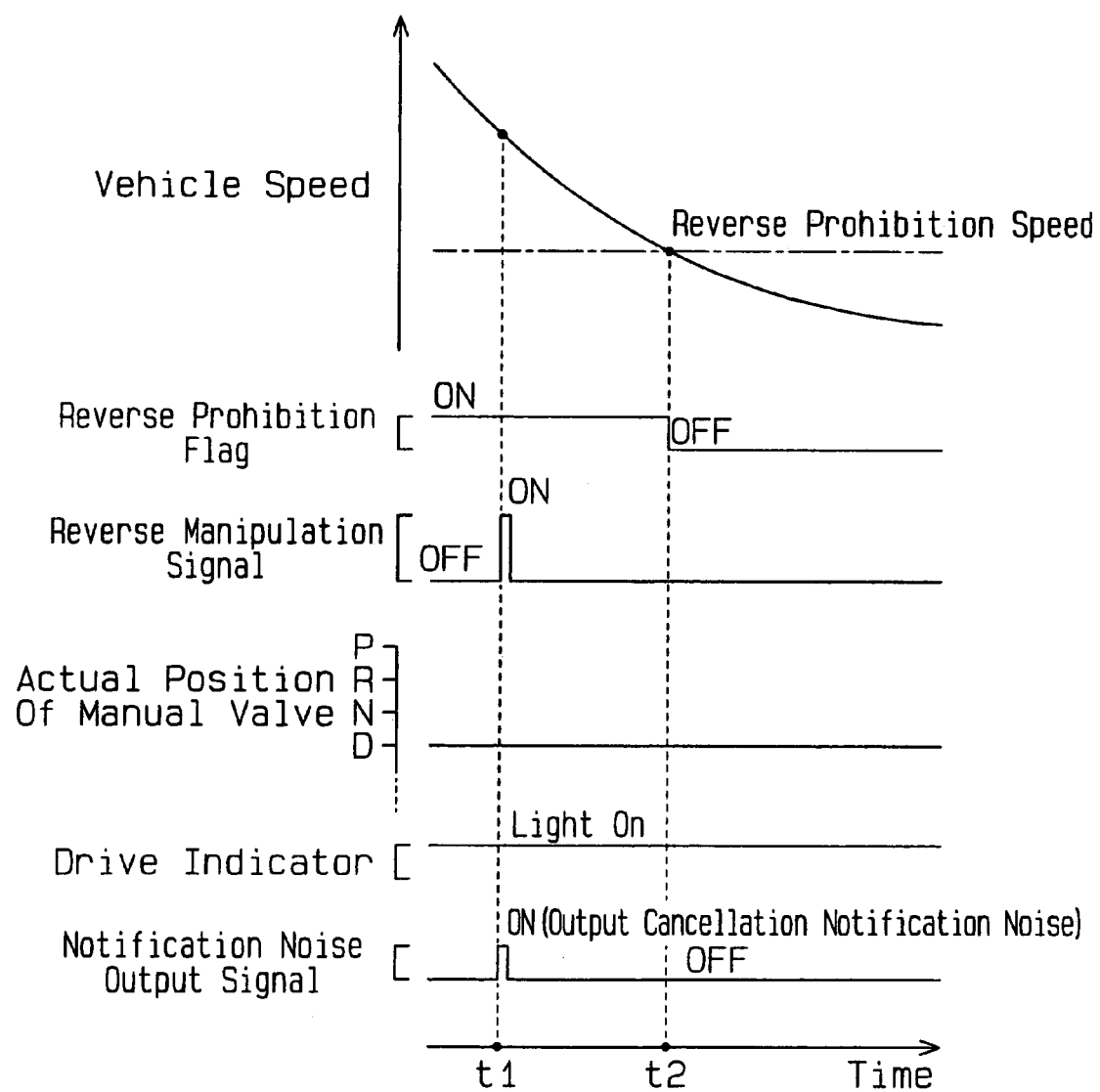
FIG. 11 is a time chart illustrating a control of the third embodiment.

FIG. 11 illustrates an example of the control state according to the third embodiment.

As mentioned above, when the vehicle is driving forward at a speed greater than or equal to the predetermined R (reverse) prohibition speed, it is prohibited to shift from the forward range (any one of the D, 3rd, 2nd, and L range) to the R range. If the vehicle speed is equal to or greater than the R prohibition speed, as shown in FIG. 11, the shift manipulation controller 120 turns on a flag (R prohibition flag) and stores a memory. The R prohibition flag is kept on as long as the vehicle speed is greater than or equal to the R prohibition speed. Therefore, according to the example shown in FIG. 11, the R prohibition flag is kept on until time t2 when the vehicle speed is less than the R prohibition speed.

The example of FIG. 11 shows a case where the actual gear range is set to the D range. At time t1, the manual valve 104 is located at the actuation position corresponding to the D range. At this time, a driver tilts the shift lever 111 to the R range side to shift the gear range to the R range. However, the vehicle speed is greater than or equal to the R prohibition speed at time t1 and the R prohibition flag is on. Therefore, the shift manipulation controller 120 determines that the shifting of the gear range to the R range is invalid and prohibits the shifting of the actual gear range to the R range.

That is, although the shift manipulation controller 120 receives the manipulation signal for shifting the gear to the R range, the manipulation is determined to be invalid since the R prohibition flag is on. Therefore, the actual gear range is kept at the D range. The indication of the first and second indicators 114, 115 are also kept at the D range. For example, the second indicator 115 on the instrument panel continues to light up the frame for the D range (D indicator). Although not shown in FIG. 11, the first indicator 114 at the shift manipulation portion 110 also maintains the indication state before the manipulation, that is, the indication state that corresponds to the D range.

Thus, the indications of the first and second indicators 114, 115 are consistent with the actual gear range. However, as mentioned above, there could be a difference between the assumption of the driver and the actual indications. Therefore, when the manipulation is determined to be invalid at time t1, the shift manipulation controller 120 sends a command signal to the buzzer 127. Then, the buzzer 127 generates a notification sound. This notifies the driver that the manipulation is cancelled.

The case when the shift manipulation from the D range to the R range is invalidated is described above as an example. However, when the other manipulations to shift the gears are cancelled based on the driving state of the vehicle, the indication of the first and second indicators 114, 115 are maintained and the driver is notified by the sound of the buzzer 127 in the same manner.

The third embodiment has the following advantages.

(1) In the third embodiment, the first and second indicators 114, 115 basically indicate the gear range corresponding to the manipulation state in sync with the manipulation state of the shift manipulation portion 110, that is, in sync with the manipulation signals sent from the switches SW1 to SW6. Therefore, although the shift lever 111, the P button 112, and the N button 113 are momentary type and automatically restored after manipulation, the driver accurately realizes the manipulation state that has been performed.

(2) The shift manipulation portion 110 according to the third embodiment performs all gear shift manipulation with the shift lever 111, the P button 112, and the N button 113, which are momentary type. Therefore, after a driver manipulates, each of the shift lever 111, the P button 112, and the N button 113 is automatically restored. Thus, a driver cannot tell the manipulation state from the appearance of the shift manipulation portion 110. Therefore, even if the actual gear range is not shifted in accordance with manipulation of the shift manipulation portion 110, the shift manipulation portion 110 does not indicate the discrepancy between the actual gear range and a gear range that the driver intended. This permits a flexible shifting control of the actual gear range.

(3) When the gear is shifted inappropriately to the current driving state of the vehicle, it is determined that the manipulation is invalid and the shifting of the actual gear range in accordance with the manipulation is prohibited. Therefore, an inappropriate shifting of the actual gear range, which applies an excessive load to the gear type transmission mechanism 102, is avoided in a suitable manner.

(4) In the third embodiment, each of the first and second indicators 114, 115 generally indicates the current gear range in sync with the manipulation of the shift manipulation portion 110. When the manipulation is cancelled, the gear range that is indicated before the manipulation is maintained. Therefore, a driver is accurately informed of the manipulation state and when the manipulation is cancelled, the actual state of the transmission is accurately notified. This reduces the possibility that a driver is disturbed.

(5) When the manipulation is invalid, the buzzer 127 generates a notification sound to notify a driver that the manipulation is cancelled. Therefore, the driver accurately recognizes the manipulation that was performed while accurately recognizing the state of the actual gear range by the indication of the first and second indicators 114, 115.

Modification of Third Embodiment

According to the first embodiment, the buzzer 127 generates a notification sound to notify a driver that the manipulation is cancelled. However, the notification system may be modified.

For example, to indicate to a driver that the manipulation is cancelled, each of the first and second indicators 114, 115 may indicate the manipulation state in a particular manner that is different from the normal gear range indication corresponding to the received manipulation signal. As long as the state is indicated when the manipulation is determined to be invalid, a driver will not be disturbed although the cancelled manipulation range and the actual gear range are inconsistent.

Each of the first and second indicators 114, 115 may maintain the indication before the manipulation and the indication may be flashed for a predetermined period. For example, in a case same as shown in FIG. 11, the frame corresponding to the D range (the D indicator) of the second indicator 115 on the instrument panel may be flashed or the first indicator 114 of the shift manipulation portion 110 may display the indication corresponding to the D range and the indication may be flashed from time t1 until a predetermined time elapses.

The second indicator 115 on the instrument panel may maintain lighting up the indication frame that corresponds to the gear range before the manipulation and flash the indication frame that corresponds to the cancelled manipulation range for a predetermined period.

The second indicator 115 on the instrument panel may maintain the indication of the gear range before the manipulation and the second indicator 114 of the shift manipulation portion 110 may indicate a particular sign (such as C), which shows the cancellation of the manipulation, for a predetermined period.

Another indicator may be arranged in addition to the first and second indicators 114, 115. In this case, when the manipulation is cancelled, the additional indicator is lighted on or flashed for a predetermined period.

In the third embodiment, the first and second indicators 114, 115 are structured as manipulation range indicating means. In this case, each of the first and second indicators 114, 115 basically informs a driver of the manipulation state (manipulation range) of the shift manipulation portion 110 in accordance with the manipulation signal received from the switches SW1 to SW6. However, the shift manipulation controller 120 may be structured such that the first and second indicators 114, 115 indicate the gear range in sync with the actual gear range. That is, the shift manipulation controller 120 may be structured such that each of the first and second indicators 114, 115 indicates the actual gear range in accordance with the detection signal from the actual position sensor 121 (or the rotational angle sensor 122). In this case, the first and second indicators 114, 115 correspond to actual gear range indicating means.

If the shift manipulation controller 120 is structured as mentioned above, the gear range indicated by each of the first and second indicators 114, 115 will not be inconsistent with the actual gear range although a particular indication control is not performed when the manipulation of the shift manipulation portion 110 performed by a driver is cancelled.

Even in this case, the driver may assume that the gear range will be shifted according to the manipulation, which has been determined invalid. Thus, the driver could be disturbed if the indication of each of the first and second indicators 114, 115 does not change. Therefore, in addition to maintaining the gear range indication, it is desirable to notify the driver that the manipulation is cancelled using a particular indicating means as mentioned above.

Fourth Embodiment

A fourth embodiment of the present invention will now be described with reference to FIG. 12. The differences from the third embodiment will mainly be discussed below.

A shift-by-wire type shift device, which shifts the actuation position of the manual valve 104, can shift the actual gear range without necessarily being consistent with the manipulation performed by a driver. Thus, the shift device can perform withholding control of the shift manipulation. That is, when the shift manipulation of the driver is inappropriate for the current driving state of the vehicle, the shifting of the actual gear range based on the manipulation is temporarily withheld. Then, the withheld shifting of the actual gear range may be performed when the driving state becomes appropriate.

Figure 12:
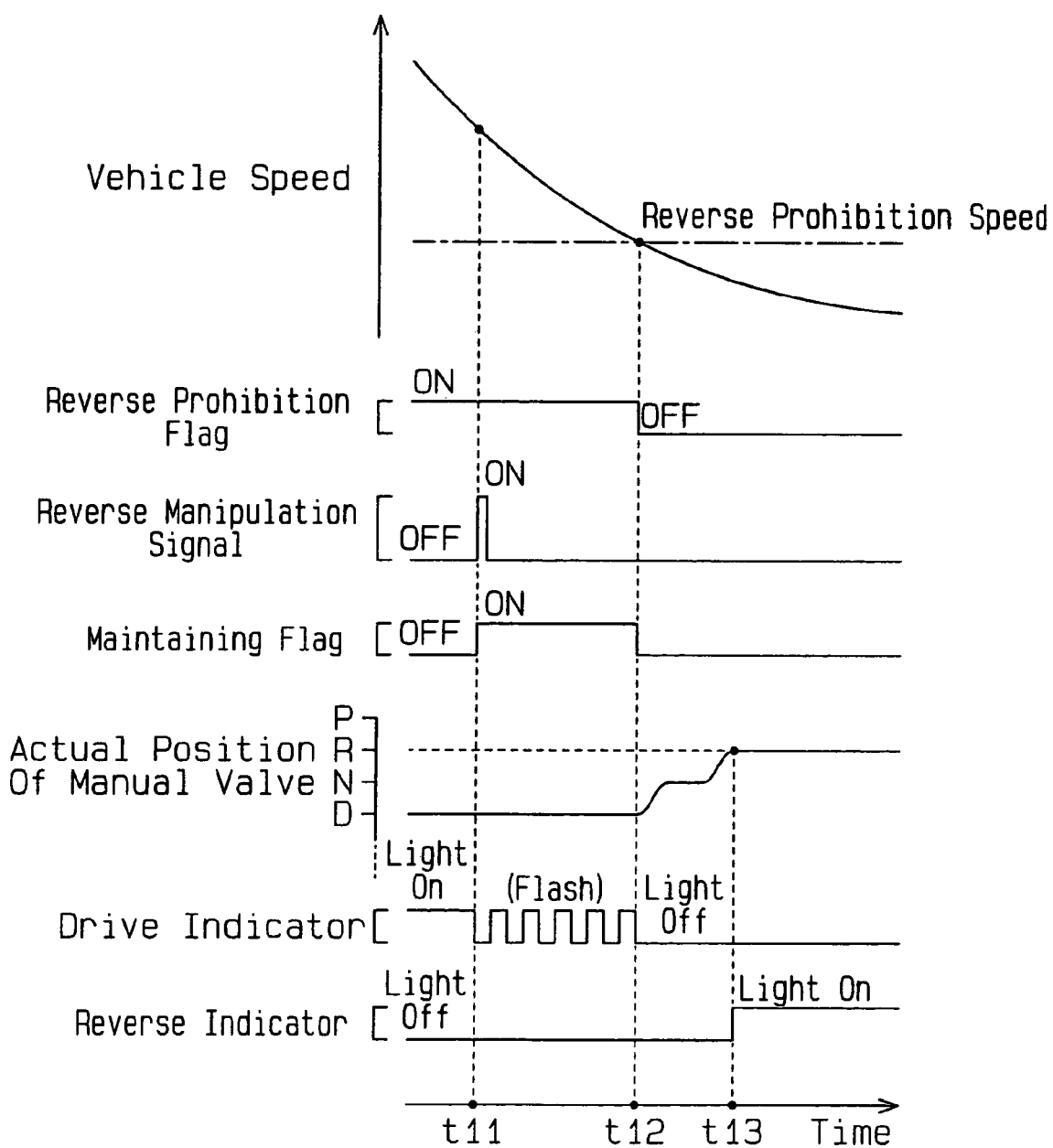
FIG. 12 is a time chart illustrating a control of a fourth embodiment of the present invention.

FIG. 12 shows an example of a shift device that performs such withholding control. According to the example shown in FIG. 12, at time t11 the actual gear range is set to the D range. At this time, the driver shifts the gear range to the R range. However, the vehicle speed is greater than or equal to the R prohibition speed at time t11 and the R prohibition flag is on. Therefore, at time t11, the shifting of the actual gear range to the R range is prohibited.

In the fourth embodiment, when it is determined that the manipulation performed by a driver is invalid, the shift manipulation controller 120 temporarily stores a memory that the invalidated manipulation was performed. In this case, the shift manipulation controller 120 stores the memory by turning on a flag (maintaining flag) for storing the memory of the invalidated manipulation when the manipulation is determined to be invalid.

The maintaining flag is provided for each manipulation for shifting gears that can be executed by a driver. Each maintaining flag is turned off when the actual gear range is shifted in accordance with the stored manipulation or when the driver performs other manipulation. Therefore, in the example shown in FIG. 12, a driver shifts the gear to the R range and the manipulation is determined to be invalid at time t11. At this time, the maintaining flag for the shifting to the R range is switched on.

At time t12, the vehicle speed is less than the R prohibition speed and the shifting of the actual gear range to the R range is permitted, which was prohibited at time t11. Thus, the shift manipulation controller 120 switches off the R prohibition flag. At time t12, the shift manipulation controller 120 refers to the maintaining flag for shifting the gear to the R range. If the maintaining flag is on, the shift manipulation controller 120 starts shifting the actual gear range to the R range.

The withholding control for shifting the gear ranges is performed as described above.

In the shift device that performs such withholding control, the gear range corresponding to the withheld manipulation is set for the manipulation range while the shifting of the actual gear range based on the manipulation is withheld. On the other hand, the actual gear range is maintained in the state before the manipulation while the shifting of the actual gear range is withheld. Therefore, the actual gear range and the manipulation range are inconsistent and could disturb a driver.

Therefore, in the fourth embodiment, the indication control of the first and second indicators 114, 115 are performed as described below to prevent a driver from being disturbed. A case is described when the first and second indicators 114, 115 are structured to be switched corresponding to the manipulation of the driver, that is, when the first and second indicators 114, 115 are structured as the manipulation range indicating means.

In the shift device according to the fourth embodiment, the shift manipulation controller 120 controls the indications of the first and second indicators 114, 115 to be different from the normal state during the execution of the withholding control to prevent the driver from being disturbed and to notify a driver that the withholding control is being performed.

In the example shown in FIG. 12, the shift manipulation controller 120 flashes the D indicator of the second indicator 115 on the instrument panel during the period from time t11, at which the shifting to the R range is withheld, to time t12, at which the withholding state is released and the shifting of the actual gear range is started. The D indicator is switched off at time t12 and the R indicator (a frame of the second indicator 115 of the instrument panel corresponding to the R range) is switched on at time 13, at which the shifting of the actual gear range to the R range is completed.

The withholding control for shifting the gear from the D range to the R range is described above as an example. However, the similar withholding control and the similar indication control may be applied when the gears are shifted between other gear ranges. When performing such withholding control, it is desirable to limit the period during which the maintaining flag is switched on. For example, the time period during which the withholding state is maintained can be limited by automatically switching the maintaining flag off after a predetermined time elapses from when the withholding flag is switched on.

The fourth embodiment provides the following advantages in addition to the advantages described in (1) and (2).

(6) According to the fourth embodiment, when a gear is shifted inappropriately for the driving state of the vehicle, the shifting of the actual gear range based on the manipulation is temporarily withheld. Then, when the driving state is appropriate for the corresponding gear shift, the shifting of the actual gear range that has been withheld is performed. Therefore, while avoiding the shifting of the actual gear range that is inappropriate and applies an excessive load to the gear type transmission 102 in a suitable manner, the manipulation that corresponds to the driver's intention is performed.

(7) According to the fourth embodiment, while the withholding control is performed, the indication of the second indicator 115 is different from the normal gear range indication that corresponds to the manipulation state of the shift manipulation portion 110. Therefore, a driver is not disturbed although the manipulation range that is being withheld and the actual gear range are inconsistent.

Modification of Fourth Embodiment

The indication state of the first and second indicators 114, 115 during the execution of the withholding control may be modified. The examples of modification are listed below.

The second indicator 115 may be structured to maintain lighting the indication frame of the gear range that has been selected before executing the withholding control during the execution of the withholding control and to flash the frame for the gear range that corresponds to the withheld manipulation. For example, under the same condition as the example shown in FIG. 12, the D indicator is maintained on from time t11 to time t12 and the R indicator is flashed from time t11 to time t13.

The indication state of the second indicator 115 on the instrument panel before the execution of the withholding control may be maintained and the first indicator 114 of the shift manipulation portion 110 may indicate a different sign during the execution of the withholding control.

Another indicator may be provided in addition to the first and second indicators 114, 115. In this case, the additional indicator is lighted or flashed during the execution of the withholding control.

A driver may be notified that the manipulation is withheld by a sound such as a notification sound from the buzzer 127 during the execution of the withholding control. As long as the manipulation state of the gear range is indicated during the execution of the withholding control by a particular indication state that is different from the normal state, a driver is not disturbed although the manipulation range that has been withheld and the actual gear range are inconsistent.

In the fourth embodiment, the first and second indicators 114, 115 are structured as the manipulation range indicating means. In this case, each of the first and second indicators 114, 115 basically shows the manipulation state (manipulation range) of the shift manipulation portion 110. However, the indicators 114, 115 may be structured as the actual gear range indicating means. In this case, each of the first and second indicators 114, 115 indicates the actual gear range corresponding to the actual position of the manual valve 104. Although the first and second indicators 114, 115 are structured as the actual gear range indicating means, the manipulation range and the actual gear range are inconsistent during the withholding control. Therefore, similarly to the fourth embodiment, each of the first and second indicators 114, 115 may indicate the manipulation state in a particular manner that is different from the normal indication state during the execution of the withholding control such that the driver is not disturbed.

Fifth Embodiment

A fifth embodiment of the present invention will now be described with reference to FIG. 13. The differences from the above illustrated embodiments will mainly be discussed below.

In the fifth embodiment, the shift manipulation controller 120 is structured such that the indication of the first and second indicators 114, 115 are controlled in sync with the actual gear range in accordance with the detection signal from the actual position sensor 121 (or the rotational angle sensor 122, or both). Therefore, the first and second indicators 114, 115 according to the fifth embodiment correspond to the actual gear range indicating means.

As mentioned earlier, the actual gear range is shifted by changing the actuation position of the manual valve 104 by driving the actuator 108. The actuation positions that correspond to the actual gear ranges of the manual valve 104 are arranged in a predetermined order as shown in FIG. 10. Therefore, when shifting the actual gear range from the P range to the D range, the manual valve 104 passes the actuation position corresponding to the R range and the N range due of the structure of the manual valve 104. That is, the gear is shifted only in the order of P, R, N, and D when shifting the actual gear range from the P range to the D range.

On the other hand, the manipulation of the shift manipulation portion 110 for shifting the actual gear range from the P range to the D range is performed by a single manipulation of tilting the shift lever 111 rearward. Therefore, according to the shift device of the fifth embodiment, the shifting step of the actual gear range from the P range to the D range and its manipulation step (shifting step of the manipulation range) are completely different. Similarly, the shifting step of the actual gear range and the shifting step of the manipulation range are also different in the gear shift from D to P, D to R, R to D, N to P, and P to N. Furthermore, the shifting step of the actual gear range and the shifting step of the manipulation range are also different in the gear shift between the forward drive gear ranges from the L range to the 3rd range excluding the D range and the N, R and P ranges. That is, in the shift device according to the fifth embodiment, the shifting step of the actual gear range differs from the shifting step of the manipulation range when shifting the gear between the gear ranges that are not adjacent to each other due to the arrangement of the actuation positions of the manual valve 104.

In the shift device according to the fifth embodiment, the manipulation of the shift manipulation portion 110 for shifting the actual gear ranges between the forward drive gear ranges (D, 3rd, 2nd, L) is performed only in the order of arrangement of the manual valve 104. Therefore, when shifting the gear ranges between the forward drive gear ranges (D, 3rd, 2nd, L), there is no difference between the shifting step of the actual gear range and the shifting step of the manipulation range.

According to such shift device, a driver might assume as described below when the shifting step of the actual gear range differs from the shifting step of the manipulation range. That is, a driver might assume that the gear is directly shifted in the same manner as the manipulation step of the shift manipulation portion 110 even when the actual gear range is shifted via other gear ranges located in between. This is a wrong assumption with regard to the structure of the shift device. As a result, the feeling that the driver receive when manipulating the shift manipulation portion 110 could differ from the shifting state of the actual gear range. Therefore, if each of the first and second indicators 114, 115 indicates the gear range corresponding to the shifting step of the actual gear range, a driver might be disturbed. A dotted line in FIG. 13 shows the indication of the second indicator 115 in the case when each of the first and second indicators 114, 115 indicates the gear range corresponding to the shifting step of the actual gear range.

In the fifth embodiment, the shift manipulation controller 120 controls the indication of each of the first and second indicators 114, 115 as described below during a period from when a driver manipulates the shift manipulation portion 110 until the shifting of the actual gear range corresponding to the manipulation is completed.

As mentioned above, the manipulation signal is sent from one of the switches SW1 to SW6 to the shift manipulation controller 120 when a driver manipulates the shift manipulation portion 110. Then, the shift manipulation controller 120 starts to control the shifting of the actual gear range to the manipulation range corresponding to the received manipulation signal. During the shifting from when the manipulation signal is received until the shifting of the actual gear range based on the manipulation signal is completed, the shift manipulation controller 120 controls the first and second indicators 114, 115. The first and second indicators 114, 115 are controlled to have a particular indication state that is different from the normal gear range indication, which is in sync with the actual gear range. Therefore, the driver in informed that the actual gear range is now being shifted based on the manipulation. Also, during the shifting of the actual gear ranges, the indication of each of the first and second indicators 114, 115 is controlled to be different from the normal state. Therefore, the driver will not be conscious about the shifting step of the actual gear range that is different from the manipulation step. This prevents the driver from being disturbed.

Figure 13:
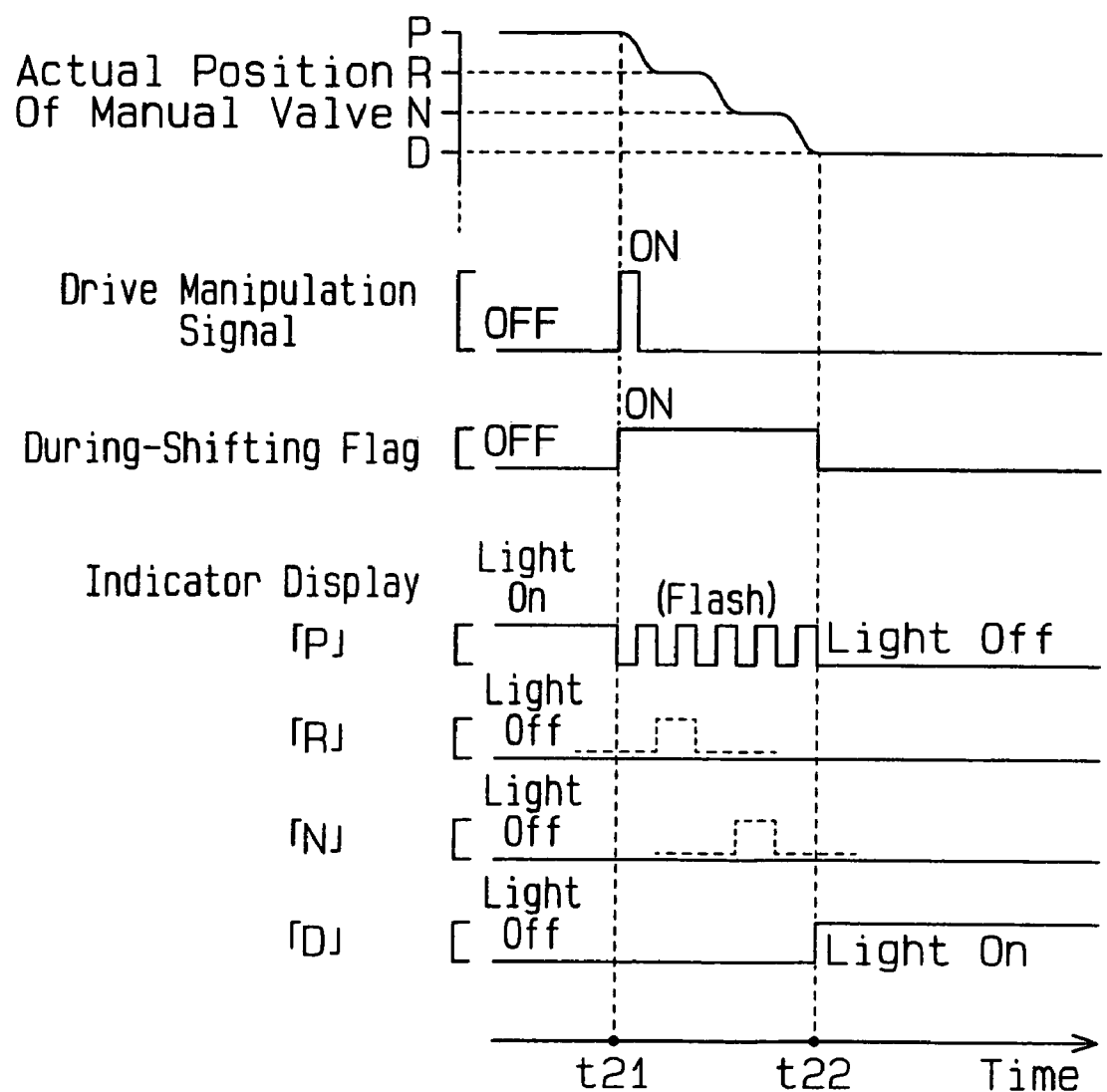
FIG. 13 is a time chart illustrating a control of a fifth embodiment of the present invention.

FIG. 13 shows an example of the control procedure according to the fifth embodiment. In the example of the control procedure, the actual gear range is set to the P range at time t21. At this time, the driver shifts the gear to the D range.

The shift manipulation controller 120 receives a manipulation signal (from the switch SW4) for shifting the gear to the D range at time t21. Then, the shift manipulation controller 120 starts shifting the actual gear range (actual position of the manual valve) by driving the actuator 108. In the fifth embodiment, the shift manipulation controller 120 further switches on a flag (a during-shifting flag) at time t21 and indicates that the actual gear range is being shifted. The during-shifting flag is kept on while the actual gear range is being shifted and is switched off when the shifting is completed. Therefore, in the example shown in FIG. 13, the during-shifting flag is switched off at time t22 when the shifting of the actual gear range (actual position of the manual valve) to the D range is completed.

In the fifth embodiment, the shift manipulation controller 120 confirms that the shifting of the actual gear range corresponding to the manipulation is completed based on the detection signal from the actual position sensor 121 (or the rotational angle sensor 122, or both). Then, the shift manipulation controller 120 switches off the during-shifting flag when the completion of the shifting is confirmed.

On the other hand, FIG. 13 also shows the indication state of the second indicator 155 before, during, and after the shifting of the actual gear range.

As shown in FIG. 13, the frame of the indicator 115 corresponding to the P range (P indicator) is lighted on before time t21, or before the driver shifts the gear from the P range to the D range.

The shift manipulation controller 120 controls the indication in a particular manner on the condition that the during-shifting flag is switched on. In the example shown in FIG. 13, the shift manipulation controller 120 controls the indication of the second indicator 115 to indicate that the gear is being shifted. The shift manipulation controller 120 flashes the frame corresponding to the actual gear range that was selected before the manipulation while the during-shifting flag is switched on.

More specifically, the shift manipulation controller 120 receives a manipulation signal for shifting the gear to the D range and switches on the during-shifting flag at time t21. At this time, the shift manipulation controller 120 starts flashing the P indicator. The P indicator keeps flashing until time t22 when the shifting of the gear to the D range is completed and the during-shifting flag is switched off. After time t22, the P indicator is lighted off and the frame corresponding to the actual gear range after the gear is shifted is lighted on. That is, the frame corresponding to the D range is lighted on according to this example.

Although not shown in FIG. 13, in the fifth embodiment, the indication of the first indicator 114 at the shift manipulation portion 110 is controlled in the same manner as the second indicator 115. In the fifth embodiment, the case when the actual gear range is shifted from the P range to the D range is described as an example. However, the shift device according to the fifth embodiment performs the same indication control when shifting the gear between other gear ranges in which the manipulation step is different from the shifting step of the actual gear ranges.

The fifth embodiment provides the following advantages in addition to the advantages described in (1) and (2).

In the fifth embodiment, the indication of the first and second indicators are different from the normal gear range indication during a period from when the shift manipulation portion 110 is manipulated until when the shifting of the actual gear range based on the manipulation is completed. Therefore, a driver is prevented from being disturbed by the inconsistency between the manipulation step (shifting step of the manipulation range) and the shifting step of the actual gear range or by the delay in the shifting of the actual gear range from the manipulation in a suitable manner.

Modification of Fifth Embodiment

The indication control of the first and the second indicators 114, 115 according to the fifth embodiment or the like may be applied to the shifting of the gear range in which the manipulation step (shifting step of the manipulation range) and the shifting step of the actual gear range are consistent such as the shifting of the actual gear range between the forward drive ranges.

In such shifting of the gear range, the shifting step of the manipulation range and the actual gear range are actually consistent. However, in the shift device according to the fifth embodiment, the actuation position of the manual valve 104 is shifted by the actuator 108. Therefore, a certain period of time is required from when a driver manipulates the shift manipulation portion 110 until when the shifting of the actual gear range is completed.

Therefore, there is a certain amount of delay in the response from when a driver manipulates the shift manipulation portion 110, that is, from when the manipulation range is shifted, until when the actual gear range is shifted based on the manipulation. Thus, even in the cases when shifting the gear between the gear ranges in which the shifting step of the manipulation range and the shifting step of the actual gear range are consistent, the manipulation range and the actual gear range are inconsistent during the period the response is delayed. This could disturb a driver.

Therefore, in the above cases, the indication control of the first and the second indicators 114, 115 according to the fifth embodiment or the like may also be applied to prevent a driver from being disturbed.

The indication of each of the first and second indicators 114, 115 during the shifting of the actual gear range is not limited to the example described in the fifth embodiment but may be modified. The modifications of the indication state are listed below.

During the shifting of the actual gear range, each of the first and second indicators 114, 115 may be controlled to flash the gear range (manipulation range) that a driver intends to shift to. That is, in the same case as shown in FIG. 13, the P indicator of the second indicator 115 is switched off at time t21 and the D indicator of the second indicator 115 is flashed from time t21 to time t22 during which the actual gear range is being shifted. The D indicator is then lighted on at time t22 when the shifting of the actual gear range is completed.

Each of the first and the second indicators 114, 115 may indicate nothing during the shifting of the actual gear range.

During the shifting of the actual gear range, one of the first and the second indicators 114, 115 may be controlled in the general procedure and the other one may be controlled in the particular state as described above.

Another indicator may be provided in addition to the first and second indicators 114, 115. In this case, during the shifting of the actual gear range, the additional indicator may be lighted on or flashed.

Furthermore, during the shifting of the actual gear range, the buzzer 127 may generate a sound such as a notification sound to inform a driver that the gear is being shifted. As long as the driver is informed in a different manner from the general indication of the gear range during the shifting of the actual gear range, the driver is prevented from being disturbed in a suitable manner.

In the fifth embodiment, each of the first and second indicators 114, 115 is structured as the actual gear range indicating means, which basically indicates the gear range in sync with the actual gear range. However, the first and the second indicators 114, 115 may be structured as the manipulation range indicating means, which indicates the manipulation range in accordance with the manipulation state of the shift manipulation portion 110. Even in this case, the actual gear range and the manipulation range are inconsistent during the shifting of the actual gear range after manipulating the shift manipulation portion 110. Therefore, each of the first and the second indicators 114, 115 may be controlled in a particular manner as described in the example during the shifting of the actual gear range to prevent a driver from being disturbed.

The shift manipulation controller 120 according to the fifth embodiment confirms the completion of the shifting of the actual gear range based on the detection signal from one or both of the actual position sensor 121 and the rotational angle sensor 122 to control the indication of the first and the second indicators 114, 115. However, a time required for shifting the actual gear range between the gear ranges in each combination of the gear ranges may be obtained by an experiment beforehand. In this case, the indication is controlled in accordance with a predetermined time. That is, the indication of the first and the second indicators 114, 115 may be controlled in a particular manner during a period from when the manipulation signal is received until the predetermined time obtained by the experiment elapses.

Further Embodiments

In the shift device according to each of the illustrated embodiments, the first and the second indicators 114, 115 are structured as the actual gear range indicating means or the manipulation range indicating means. However, one of the first and second indicators 114, 115 may be structured as the actual gear range indicating means and the other one may be structured as the manipulation range indicating means. For example, the shift device may be structured such that the first indicator 114 of the shift manipulation portion 110 indicates the manipulation range and the second indicator 115 on the instrument panel indicates the actual gear range.

In this case, as long as a driver sufficiently understands which of the first and second indicators 114, 115 indicates which of the manipulation range and the actual gear range, the driver is not disturbed even if the manipulation range and the actual gear range are inconsistent. The driver can confirm and compare the indications of the first and the second indicators 114, 115 to acknowledge the current status accurately.

However, when applying the control procedure of canceling the manipulation as described in the third embodiment to the shift device structured as above, it is required to be careful about the following. That is, if the manipulation range that has been invalidated is indicated in the indicator until a driver manipulates the shift manipulation portion 110 again, the indications of the indicators are inconsistent for a long period. This could disturb the driver.

However, even in this case, applying the indication control as described in the third embodiment to the indicator that indicates the manipulation range avoids causing a driver to be disturbed. It is also possible to prevent a driver from being disturbed by indicating the gear range corresponding to the manipulation signal in the indicator once and then shifting the indication to the actual gear range after a predetermined time elapses from when the manipulation is determined to be invalid. Furthermore, a driver will not be disturbed if the indicator for the manipulation range indicates the gear range corresponding to the manipulation signal for a predetermined time only from when the manipulation signal is received no matter the manipulation is valid or invalid.

Although the shift device includes both the indicator that indicates the manipulation range and the indicator that indicates the actual gear range, the indication control as described in each embodiment may be applied to one or both of the indicators. Therefore, a driver is accurately informed of the current state and thus the possibility that the driver is disturbed is reduced.

Further Modifications are Listed Below

The first and second indicators 114, 115 are arranged on the shift manipulation portion 110 and the instrument panel. However, the position and the number of the indicators and the way to indicate the gear range may be changed.

The shift manipulation portion 110 is structured by a combination of the shift lever 111, and the pushbuttons, or the P and N buttons 112, 113. However, the structure of the shift manipulation portion 110 may be modified.

For example, the shift manipulation portion 110 may be structured such that all the gear ranges can be shifted only by a lever or the shift manipulation portion 110 may be structured to include a pushbutton for each actual gear range.

The AT other than that shifts four gears of forward drive may be used.

The invention claimed is:

1. A shift device of a vehicle comprising:
   a gear range shifting mechanism, which is actuated to mechanically shift the actual gear ranges of a transmission;
   an actuator for actuating the gear range shifting mechanism;
   manipulation range detecting means for detecting a manipulation range, wherein the manipulation range represents manipulation of a shift manipulation portion by a driver;
   actual gear range detecting means for detecting the actual gear range of the transmission;
   a controller for shifting the actual gear ranges of the transmission by controlling the actuator in accordance with detection signals from the manipulation range detecting means and the actual gear range detecting means; and
   manipulation range indicating means for indicating the manipulation range based on the detection signal from the manipulation range detecting means, wherein the manipulation range indicating means allows to indicate that the manipulation range does not correspond to the detection signal from the manipulation range detecting means,
   further comprising an actual gear range indicating means for indicating the actual gear range in accordance with the detection signal from the actual gear range detecting means.

2. A shift device of a vehicle comprising:
   a gear range shifting mechanism, which is actuated to mechanically shift the actual gear ranges of a transmission;
   an actuator for actuating the gear range shifting mechanism;
   manipulation range detecting means for detecting a manipulation range, wherein the manipulation range represents manipulation of a shift manipulation portion by a driver;
   actual gear range detecting means for detecting the actual gear range of the transmission;
   a controller for shifting the gear ranges of the transmission by controlling the actuator in accordance with detection signals from the manipulation range detecting means and the actual gear range detecting means; and
   actual gear range indicating means for indicating the actual gear range based on the detection signal from the actual gear range detecting means, wherein the actual gear range indicating means allows to indicate that the actual gear range does not correspond to the detection signal from the actual gear range detecting means,
   further comprising a manipulation range indicating means for indicating the manipulation range in accordance with the detection signal from the manipulation range detecting means.

3. A shift device of a vehicle comprising:
   a gear range shifting mechanism, which is actuated to mechanically shift the actual gear ranges of a transmission;
   an actuator for actuating the gear range shifting mechanism;
   manipulation range detecting means for detecting a manipulation range, wherein the manipulation range represents manipulation of a shift manipulation portion by a driver;
   actual gear range detecting means for detecting the actual gear range of the transmission;
   a controller for shifting the gear ranges of the transmission by controlling the actuator in accordance with detection signals from the manipulation range detecting means and the actual gear range detecting means;
   manipulation range indicating means for indicating the manipulation range based on the detection signal from the manipulation range detecting means; and
   actual gear range indicating means for indicating the actual gear range based on the detection signal from the actual gear range detecting means.

4. The shift device of a vehicle according to claim 3, wherein the shift manipulation portion includes a manipulation member, and wherein the manipulation member is automatically restored to a position before being manipulated by the driver.

5. A shift device of a vehicle comprising:
   a gear range shifting mechanism, which is actuated to mechanically shift the actual gear ranges of a transmission;
   an actuator for actuating the gear range shifting mechanism;
   manipulation range detecting switch for detecting a manipulation range, wherein the manipulation range represents manipulation of a shift manipulation portion by a driver;
   actual gear range detecting means for detecting the actual gear range of the transmission;
   a controller for shifting the gear ranges of the transmission by controlling the actuator in accordance with detection signals from the manipulation range detecting switch and the actual gear range detecting sensor;
   actual gear range indicating device for indicating the actual gear range based on the detection signal from the actual gear range detecting switch, wherein the actual gear range indicating device is allowed to indicate the actual gear range in a manner that does not correspond to the detection signal from the actual gear range detecting sensor.

6. A shift device of a vehicle comprising:
   a gear range shifting mechanism, which is actuated to mechanically shift the actual gear ranges of a transmission;
   an actuator for actuating the gear range shifting mechanism;
   manipulation range detecting switch for detecting a manipulation range, wherein the manipulation range represents manipulation of a shift manipulation portion by a driver;
   actual gear range detecting means for detecting the actual gear range of the transmission;
   a controller for shifting the gear ranges of the transmission by controlling the actuator in accordance with detection signals from the manipulation range detecting switch and the actual gear range detecting sensor;
   manipulation range indicating device for indicating the manipulation range based on the detection signal from the manipulation range detecting switch; and
   actual gear range indicating device for indicating the actual gear range based on the detection signal from the actual gear range detecting sensor.

* * * * *